(12) United States Patent
Franks et al.

(10) Patent No.: US 8,486,274 B2
(45) Date of Patent: Jul. 16, 2013

(54) STIMULANT SENSITIVE FLOCCULATION AND CONSOLIDATION

(75) Inventors: George V. Franks, Eltham (AU);
Graeme John Jameson, Newcastle (AU); Yao-de Yan, Newcastle (AU);
Simon Richard Biggs, Wetherby (GB)

(73) Assignee: Newcastle Innovation Limited, Callaghan, New South Wales (AU)

( * ) Notice: Subject to any disclaimer, the term of this patent is extended or adjusted under 35 U.S.C. 154(b) by 1117 days.

(21) Appl. No.: 10/599,304

(22) PCT Filed: Aug. 27, 2004

(86) PCT No.: PCT/AU2004/001158
§ 371 (c)(1),
(2), (4) Date: Apr. 25, 2008

(87) PCT Pub. No.: WO2005/021129
PCT Pub. Date: Mar. 10, 2005

(65) Prior Publication Data
US 2008/0190860 A1  Aug. 14, 2008

(30) Foreign Application Priority Data

Aug. 29, 2003 (AU) ................................ 2003904751
Mar. 25, 2004 (AU) ................................ 2004901610

(51) Int. Cl.
*C02F 1/00* (2006.01)
*C02F 1/34* (2006.01)
*C02F 1/48* (2006.01)
*C02F 1/36* (2006.01)
*C02F 1/30* (2006.01)
*C02F 1/32* (2006.01)
*C02F 1/52* (2006.01)
*B01D 21/01* (2006.01)
*B03D 3/00* (2006.01)

(52) U.S. Cl.
USPC ............ 210/748.01; 210/748.05; 210/748.09; 210/748.1; 210/748.16; 210/732; 209/4; 209/5

(58) Field of Classification Search
USPC ......................................................... 210/710
See application file for complete search history.

(56) References Cited

U.S. PATENT DOCUMENTS 3,020,231 A * 2/1962 Colwell et al. ................. 210/727
3,194,758 A * 7/1965 Lissant ......................... 210/732

(Continued)

FOREIGN PATENT DOCUMENTS
WO   WO9950188   10/1999
WO   WO9950195   10/1999

(Continued)

OTHER PUBLICATIONS

Carlson, et al., International Journal of Modern Physics B., 1996, vol. 10, Issue 23-24, pp. 2857-2865.

(Continued)

*Primary Examiner* — Nam Nguyen
*Assistant Examiner* — Clare Perrin
(74) *Attorney, Agent, or Firm* — Polsinelli PC; Teddy C. Scott, Jr.; Ron Galant

(57) ABSTRACT

The present invention relates to methods for the separation of materials from heterogeneous fluids and provides a means of effecting stimulant-sensitive flocculation and consolidation of solid suspensions within a liquid medium. Specifically, the present invention provides a method of controlling the state of a suspension of solid particles in a liquid, including applying to the suspension a stimulus adapted to control inter-particle forces between the solid particles. The stimulus is reversibly operable to control attraction and/or repulsion. Means of consolidating a sediment bed and of separating the resultant liquids-rich and solids-rich phases are also within the ambit of the invention.

11 Claims, 21 Drawing Sheets

U.S. PATENT DOCUMENTS

| | | | | |
|---|---|---|---|---|
| 3,723,310 | A * | 3/1973 | Lang et al. | 210/727 |
| 4,279,756 | A * | 7/1981 | Weiss et al. | 210/667 |
| 4,298,169 | A * | 11/1981 | Iwasaki | 241/16 |
| 4,536,294 | A * | 8/1985 | Guillet et al. | 210/730 |
| 5,055,201 | A * | 10/1991 | Wegner | 210/727 |
| 5,076,950 | A * | 12/1991 | Ullman et al. | 252/62.51 R |
| 5,370,993 | A * | 12/1994 | Tarnowski et al. | 435/7.21 |
| 6,051,143 | A * | 4/2000 | Somasundaran et al. | 210/729 |
| 6,171,506 | B1 * | 1/2001 | Allen et al. | 210/728 |
| 6,979,405 | B2 * | 12/2005 | Weir | 210/727 |
| 2011/0155671 | A1 * | 6/2011 | Moody et al. | 210/734 |

FOREIGN PATENT DOCUMENTS

| | | |
|---|---|---|
| WO | WO0105712 | 1/2001 |
| WO | WO0110530 | 2/2001 |
| WO | WO0204360 | 1/2002 |

OTHER PUBLICATIONS

Japanese Abstract of Patent No. JP56091807 Flocculation of Suspension in Liquid, Fuji, Kikai Seisakusho:kk; Jul. 25, 1981.

Liu, J., Magnetorheological Fluids: From Basic Physics to Application, JSME International Journal, Series B, vol. 45, No. 1, pp. 55-60, 2002.

Jong Hyeok Park & O Ok Park, Electrorheology and Magnetorheology, Korea-Australia Rheology Journal, vol. 13, No. 1, Mar. 2001.

Bossis, G., et al., Magnetorheology: Fluids, Structures & Rheology Ferrofluids: Magnetically Controllable Fluids and their Applications, Lecture Notes in Physics, vol. 594, pp. 200-230, 2002.

J.D. Carlson, et al., Commercial Magneto-Rheological Fluid Devices, International Journal of Modern Physics B, vol. 10, Nos. 23 and 24 (1996), pp. 2857-2865.

\* cited by examiner

STIMULANT SENSITIVE FLOCCULATION AND CONSOLIDATION

TECHNICAL FIELD

The present invention relates to separatory methods and particularly to methods for the separation of materials from heterogeneous fluids. The present invention is particularly applicable to the separation of solid particles from liquids.

The invention has been developed primarily for use as a means of effecting stimulant-sensitive flocculation and consolidation of solid suspensions within a liquid medium and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of common general knowledge in the field.

Environmental changes and population growth are putting increasing pressure on water supplies as we enter the 21st century. Processes such as wastewater purification, sewage treatment and minerals processing rely upon the efficient removal of suspended solids in the form of fine colloidal particles with sizes in the sub-micron range. Brownian motion and small particle mass produce very slow sedimentation rates of these small particles when dispersed in a liquid (such as water), which make removal of those particles from the liquid a difficult operation. It is common practice that the particles are usually caused to aggregate to facilitate more rapid settling and easy removal of the solids by gravity. In an aqueous system, this can be achieved in a number of ways including the addition of excess electrolyte (coagulation), the addition of a high molecular weight polymer (bridging flocculation) and change of pH. Bridging flocculation is important in wastewater treatment and mineral tailings disposal.

In addition to rapid sedimentation, the properties of the resulting dewatered product (sediment or filter cake in the case of filtration) are important for the down stream processing. The consolidation behaviour and rheological (flow) of the sediment bed (including compressive yield stress $P_Y$ and shear yield stress $\tau_Y$) are important in both the dewatering operation and the down stream processes. For instance, the final liquid content (moisture in the case of water) of the sediment should usually be minimised. Low moisture contents in sediments means that there is better solid/fluid separation efficiency, which is usually the desired goal. Quickly reaching that high separation efficiency is also desirable form an economic point of view. The compressive yield stress and the hindered settling factor are parameters that can be used to characterise the moisture content of the dewatered product and the rate of dewatering respectively. The viscosity and shear yield stress of the dewatered suspension are important factors in the pumping of the dewatered suspensions during processing and disposal.

For example the treatment of waste-water at a solids volume fraction of around 1% from a mineral processing plant are initially flocculated at the inlet to a thickener. The solids are then concentrated by gravitational sedimentation to the bottom of the thickener. The underflow from the thickener will have a solids volume fraction of +20%. This slurry is then passed through a high shear pump before further processing in a tailings pond to remove as much of the remaining moisture as possible. The clear water from the top portion of the tailings pond is typically recycled back to the processing plant for reuse. However, increased environmental pressures encourage the use of an in-line filtration step resulting in a 'dry cake' that is more easily transported and used as back fill. Ultimately more efficient solid/liquid separation results in both a lower volume of solids containing suspension to be disposed of and a greater fraction of recycled water.

Previous analysis of processes similar to the above can separate the process into a number of steps. These include settling, sediment consolidation, sediment pumping and filtration of the sediments. The precise demarcation between these steps is sometimes not clear and they are influenced to a large extent by the state of the initial suspension. The process of efficiently and rapidly separating the solid particles from a fluid and recovering the associated fluid phase is quite complex. It is possible to separately optimise the settling, sediment consolidation, sediment pumping and filtration steps by, for example, different chemical additives or adjustment of process variables such as pressure and shear rate. However, obtaining optimum properties for each step can typically be mutually exclusive when the solution conditions are maintained constant.

To explain, settling depends to a large extent on aggregate size and its density. Consolidation of the sediment bed occurs in response to an applied load. The efficiency of such consolidation depends upon the compressive yield strength of the bed. In sediment pumping, the flow of the sediment in response to a shear stress depends upon the shear yield stress and viscosity of the sediment particle network. Filtration of the sediment will depend upon the applied pressure, the network compressive yield strength and permeability/pore distribution in the bed.

As can be seen from the above, there are a number of competing interests when separating solids from solid/liquid suspensions.

It is an object of the present invention to overcome or ameliorate at least one of the disadvantages of the prior art, or to provide a useful alternative.

DISCLOSURE OF THE INVENTION

According to a first aspect of the present invention there is provided a method of controlling the condition of a suspension of solid particles within a liquid including applying one or more stimuli to said suspension, said one or more stimuli adapted to control inter-particle forces between said solid particles, wherein each stimulus is selectively operable to effect conditioning between an initial state prevailing prior to said applying one or more stimuli and a conditioned state resultant from said applying one or more stimuli, thereby to control interaction between said solid particles within said liquid.

Preferably, the conditioning is reversibly operable. In an embodiment, the reversibly operable conditioning is facilitated by removal of one or more stimuli. In a further embodiment, the reversibly operable conditioning is facilitated by addition of another of the one or more stimuli. In a further embodiment, the reversibly operable conditioning is facilitated by removal of one or more stimuli and/or addition of another of one or more stimuli.

Preferably, the conditioning is substantially by way of flocculation and/or coagulation. Preferably, the inter-particle forces may be attractive or repulsive between the solid particles within the liquid.

Preferably, each of the one or more stimuli is applied for a predetermined time, thereby to induce the desired attraction or repulsion and subsequently removed or altered, thereby to effect the reversibility. More preferably, each of the one or more stimuli is a change in pH, temperature, wavelength of light or the absence thereof, chemical additive, or a combination thereof.

In an embodiment, the stimulus is a change in pH. In another embodiment, the stimulus is a change in temperature. In a further embodiment, the stimulus is a combination of change in pH and change in temperature, thereby to induce attractive or repulsive inter-particle forces, as desired.

In a further embodiment, the stimulus is by way of exposure to light, or the absence thereof. Preferably, the light includes wavelengths within the range of substantially ultraviolet to substantially visible. Preferably, the light stimulus is applied in combination with variations in pH and/or temperature.

In a further embodiment, the stimulus is provided by way of addition of one or more predetermined chemical additives. Preferably, the chemical additive is a single chemical capable of acting as flocculant or dispersant depending on the selection of predetermined process parameters. Preferably, the chemical additive is in the form of a photosensitive flocculant.

In a further embodiment, the chemical additive is a stimulus-sensitive polymer. Preferably, the stimulus-sensitive polymer is a polyelectrolyte. Preferably, the polyelectrolyte maybe cationic, anionic, non-ionic, or a combination thereof. More preferably, the polyelectrolyte is adsorbable onto the surface of said solid particles. Preferably, the polyelectrolyte adsorbs onto the surface of the particle in a sufficient quantity as to create steric or electrostatic repulsion between the particles. Preferably, the polyelectrolyte is substantially soluble at pH values where it is substantially charged, thereby to effect dispersion of the suspension. Preferably, the polyelectrolyte is substantially insoluble at pH values where it is substantially uncharged, thereby to effect flocculation of the suspension.

Preferably, the polyelectrolyte is selected from the group consisting of chitosan, polyacrylic acid, polyacrylamides and derivatives thereof, polymethacrylic acid, poly sodium acrylate, polystyrene sulfanate, polysulfanamide, poly(2-vinyl pyridine), poly(vinylpyridinium bromide), poly(diallyldimethylammonium chloride) (DADMAC), poly(diethylamine), poly(epichlorohydrin), polymers of quarternised dimethylaminoethyl acrylates, polymers of quarternised dimethylaminoethyl acrylamides, poly(ethyleneimine) and polyglucose amine.

Preferably, the polyelectrolyte is selected from the group consisting of homo- and copolymers prepared from ethylenic unsaturated monomers including methacrylic acid and salts thereof, methacrylamide, acrylamido methyl propyl sulfonic acid (AMPS) and/or styrene sulfanate and salts thereof. Preferably, the polyelectrolyte is chitosan or polyacrylic acid.

In a further embodiment, the polyelectrolyte is a polysaccharide. Preferably, the polysaccharide is selected from the group consisting of xanthan, carragenan, agarose, agar, pectin, guar gum, starches and alginic acid. Preferably, the polysaccharide is a derivatised polysaccharide selected from the group consisting of carboxy methyl cellulose and hydroxy propyl guar.

In an embodiment, the polymer is temperature-sensitive. Preferably, the temperature sensitivity is such that the polymer is substantially soluble or substantially insoluble at substantially low temperatures. Preferably, the temperature sensitivity is such that the polymer is substantially insoluble (thereby to gel) or substantially soluble, at substantially high temperatures.

In an embodiment, the temperature sensitive polymer is a single polymer, or a combination of polymers. Preferably, the temperature sensitive polymer is selected from the group consisting of poly(N-isopropylacrylamide) (poly(NIPAM)), co-polymers of poly NIPAM with other polymers such as polyacrylic acid, poly(dimethylaminopropylacryl-amide) or poly(diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches and alginic acid. More preferably, the temperature sensitive polymer is methylcellulose or poly(NIPAM).

In an embodiment, the chemical additive is a photosensitive molecule wherein the photosensitivity is manifested in its solubility characteristics. Preferably, the photosensitive molecule is incorporated within one or more polymers. More preferably, at least one of the one or more polymers is a water soluble polymer. Preferably, the polymers suitable for the inclusion of photosensitive units include polypeptides. Preferably, the polypeptides are selected from the group consisting of lysine and glutamic acid. Preferably, the polymer is selected from the group consisting of polyacrylamides, polysaccharides, polyelectrolytes and other water-soluble molecules.

In an embodiment, the photosensitive units are spyropyrans and/or spyrooxazines. Preferably, the spyropyrans and/or spyrooxazines are selected from the group consisting of benzoindolino pyranospiran (BIPS), benzoindolino spyrooxazine (BISO), naphthalenoindolino spyrooxazine (NISO) and quinolinylindolino spyrooxazine (QISO). Preferably, the photosensitive units are azo benzene and similar groups, triphenyl methane derivatives and similar groups. Preferably, the photosensitive molecule is triggered by a change in the wavelength of light from substantially visible to substantially ultraviolet.

In an embodiment, the polymers responsive to the change in wavelength are selected from the group consisting of poly dimethylacrylamide/N-4-phenylazophenyl-acrylamide (DMAAm), poly dimethylacrylamide/4-phenylazophenylacryate (DMAA) and similar polymers. Preferably, the chemical additive is one or more copolymers added to the suspension.

In an embodiment, the component monomers within the copolymer may be dispersed randomly, alternately or in blocks. Preferably, the copolymer is a block copolymer. Preferably, the block copolymer is selected from the group consisting of AB blocks, ABA blocks, ABC blocks, comb, ladder, and star copolymers. More preferably, the block copolymer includes sectors that variously adsorb to said surface of the particles in suspension, and/or are sensitive to a stimulus. Preferably, the stimulus is one or more of change in pH, change in temperature, change in the wavelength of light, or the absence thereof. Preferably, the copolymers are selected from the group consisting of polyethyleneoxide-polypropyleneoxide-polyethyleneoxide (PEO/PPO/PEO) triblock copolymers. More preferably, the PEO/PPO/PEO triblock copolymer is a Pluronics polymer. Preferably, the copolymer includes one or more polypropylene oxide sectors, thereby to adsorb particularly to hydrophobic particles, and one or more polyethylene oxide sectors thereby to provide inter-particular steric repulsion at substantially room temperature.

In an embodiment, the copolymer(s) are comb copolymer(s), thereby having a backbone that enhances the surface adsorption, and teeth that are stimulus-sensitive. Preferably, the comb copolymer includes a polyacrylic acid backbone and polyethelyne oxide teeth.

The method of the invention is preferably used in conjunction with gravimetric thickening devices and/or tailings lagoons. Preferably, the method of the invention is applied to mineral slurries.

According to a second aspect of the present invention there is provided a method of controlling the consolidation of a bed of solid particles within a liquid including applying one or more stimuli to said bed, said one or more stimuli adapted to control inter-particle forces between said solid particles, wherein each stimulus is selectively operable to effect conditioning between an initial state prevailing prior to said applying one or more stimuli and a conditioned state resultant from said applying one or more stimuli, thereby to control interaction between said solid particles within said liquid, said stimulus being applied for a predetermined time thereby to liberate at least some liquid otherwise trapped within said bed.

Preferably, the conditioning is reversibly operable. In an embodiment, the reversibly operable conditioning is facilitated by removal of one or more stimuli. In a further embodiment, the reversibly operable conditioning is facilitated by addition of another of the one or more stimuli. In a further embodiment, the reversibly operable conditioning is facilitated by removal of one or more stimuli and/or addition of another of one or more stimuli.

Preferably, the bed is a sediment bed, a filtercake, or the product of a centrifuge. Preferably, removal of or a change in the stimulus provides for further settling/consolidation of the particles within the sediment bed. Preferably, the stimulus is a chemical additive, added to a suspension prior to formation of the sediment bed, thereby to effect substantially thorough mixing of the additive within the sediment bed.

Preferably, the conditioning is substantially by way of flocculation and/or coagulation. Preferably, the inter-particle forces may be attractive or repulsive between the solid particles within the liquid.

Preferably, each of the one or more stimuli is applied for a predetermined time, thereby to induce the desired attraction or repulsion and subsequently removed or altered, thereby to effect the reversibility. More preferably, each of the one or more stimuli is a change in pH, temperature, wavelength of light or the absence thereof, chemical additive, or a combination thereof.

In an embodiment, the stimulus is a change in pH. In another embodiment, the stimulus is a change in temperature. In a further embodiment, the stimulus is a combination of change in pH and change in temperature, thereby to induce attractive or repulsive inter-particle forces, as desired.

In a further embodiment, the stimulus is by way of exposure to light, or the absence thereof. Preferably, the light includes wavelengths within the range of substantially ultraviolet to substantially visible. Preferably, the light stimulus is applied in combination with variations in pH and/or temperature.

In a further embodiment, the stimulus is provided by way of addition of one or more predetermined chemical additives. Preferably, the chemical additive is a single chemical capable of acting as flocculant or dispersant depending on the selection of predetermined process parameters. Preferably, the chemical additive is in the form of a photosensitive flocculant.

In a further embodiment, the chemical additive is a stimulus-sensitive polymer. Preferably, the stimulus-sensitive polymer is a polyelectrolyte. Preferably, the polyelectrolyte maybe cationic, anionic, non-ionic, or a combination thereof. More preferably, the polyelectrolyte is adsorbable onto the surface of said solid particles. Preferably, the polyelectrolyte adsorbs onto the surface of the particle in a sufficient quantity as to create steric or electrostatic repulsion between the particles. Preferably, the polyelectrolyte is substantially soluble at pH values where it is substantially charged, thereby to effect dispersion of the suspension. Preferably, the polyelectrolyte is substantially insoluble at pH values where it is substantially uncharged, thereby to effect flocculation of the suspension.

Preferably, the polyelectrolyte is selected from the group consisting of chitosan, polyacrylic acid, polyacrylamides and derivatives thereof, polymethacrylic acid, poly sodium acrylate, polystyrene sulfanate, polysulfanamide, poly(2-vinyl pyridine), poly(vinylpyridinium bromide), poly(diallyldimethylammonium chloride) (DADMAC), poly(diethylamine), poly(epichlorohydrin), polymers of quarternised dimethylaminoethyl acrylates, polymers of quarternised dimethylaminoethyl acrylamides, poly(ethyleneimine) and polyglucose amine.

Preferably, the polyelectrolyte is selected from the group consisting of homo- and copolymers prepared from ethylenic unsaturated monomers including methacrylic acid and salts thereof, methacrylamide, acrylamido methyl propyl sulfonic acid (AMPS) and/or styrene sulfanate and salts thereof. Preferably, the polyelectrolyte is chitosan or polyacrylic acid.

In a further embodiment, the polyelectrolyte is a polysaccharide. Preferably, the polysaccharide is selected from the group consisting of xanthan, carragenan, agarose, agar, pectin, guar gum, starches and alginic acid. Preferably, the polysaccharide is a derivatised polysaccharide selected from the group consisting of carboxy methyl cellulose and hydroxy propyl guar.

In an embodiment, the polymer is temperature-sensitive. Preferably, the temperature sensitivity is such that the polymer is substantially soluble or substantially insoluble at substantially low temperatures. Preferably, the temperature sensitivity is such that the polymer is substantially insoluble (thereby to gel) or substantially soluble, at substantially high temperatures.

In an embodiment, the temperature sensitive polymer is a single polymer, or a combination of polymers. Preferably, the temperature sensitive polymer is selected from the group consisting of poly(N-isopropylacrylamide) (poly(NIPAM)), co-polymers of poly NIPAM with other polymers such as polyacrylic acid, poly(dimethylaminopropylacryl-amide) or poly(diallyldimethylammonium chloride) (DADMAC), polyethylene oxide, poly propylene oxide, methylcellulose, ethyl hydroxyethyl cellulose, carboxymethyl cellulose, hydrophobically modified ethyl hydroxyethyl cellulose, poly dimethylacrylamide/N-4-phenylazophenylacrylamide (DMAAm) and poly dimethylacrylamide/4-phenylazophenylacryate (DMAA) and other related polymers, gelatine, agarose, amylase, agar, pectin, carragenan, xanthan gum, guar gum, locust bean gum, hyaluronate, dextran, starches and alginic acid. More preferably, the temperature sensitive polymer is methylcellulose or poly(NIPAM).

In an embodiment, the chemical additive is a photosensitive molecule wherein the photosensitivity is manifested in its solubility characteristics. Preferably, the photosensitive molecule is incorporated within one or more polymers. More preferably, at least one of the one or more polymers is a water soluble polymer. Preferably, the polymers suitable for the inclusion of photosensitive units include polypeptides. Preferably, the polypeptides are selected from the group consisting of lysine and glutamic acid. Preferably, the polymer is selected from the group consisting of polyacrylamides, polysaccharides, polyelectrolytes and other water-soluble molecules.

In an embodiment, the photosensitive units are spyropyrans and/or spyrooxazines. Preferably, the spyropyrans and/or spyrooxazines are selected from the group consisting of benzoindolino pyranospiran (BIPS), benzoindolino spyrooxazine (BISO), naphthalenoindolino spyrooxazine (NISO) and quinolinylindolino spyrooxazine (QISO). Preferably, the photosensitive units are azo benzene and similar groups, triphenyl methane derivatives and similar groups. Preferably, the photosensitive molecule is triggered by a change in the wavelength of light from substantially visible to substantially ultraviolet.

In an embodiment, the polymers responsive to the change in wavelength are selected from the group consisting of poly dimethylacrylamide/N-4-phenylazophenyl-acrylamide (DMAAm), poly dimethylacrylamide/4-phenylazophenylacryate (DMAA) and similar polymers. Preferably, the chemical additive is one or more copolymers added to the suspension.

In an embodiment, the component monomers within the copolymer may be dispersed randomly, alternately or in blocks. Preferably, the copolymer is a block copolymer. Preferably, the block copolymer is selected from the group consisting of AB blocks, ABA blocks, ABC blocks, comb, ladder, and star copolymers. More preferably, the block copolymer includes sectors that variously adsorb to said surface of the particles in suspension, and/or are sensitive to a stimulus. Preferably, the stimulus is one or more of change in pH, change in temperature, change in the wavelength of light, or the absence thereof. Preferably, the copolymers are selected from the group consisting of polyethyleneoxide-polypropyleneoxide-polyethyleneoxide (PEO/PPO/PEO) triblock copolymers. More preferably, the PEO/PPO/PEO triblock copolymer is a Pluronics polymer. Preferably, the copolymer includes one or more polypropylene oxide sectors, thereby to adsorb particularly to hydrophobic particles, and one or more polyethylene oxide sectors thereby to provide inter-particular steric repulsion at substantially room temperature.

In an embodiment, the copolymer(s) are comb copolymer(s), thereby having a backbone that enhances the surface adsorption, and teeth that are stimulus-sensitive. Preferably, the comb copolymer includes a polyacrylic acid backbone and polyethelyne oxide teeth.

The method of the invention is preferably used in conjunction with gravimetric thickening devices and/or tailings lagoons. Preferably, the method of the invention is applied to mineral slurries.

According to a third aspect of the present invention there is provided a method of separating solid particles from a liquid including applying the method according to the first and/or second aspect, for a predetermined time thereby to provide a solids-rich phase and a liquids-rich phase and then separating said two phases.

The method of the invention is preferably used in conjunction with gravimetric thickening devices and/or tailings lagoons. Preferably, the method of the invention is applied to mineral slurries.

In other preferred embodiments, the present invention provides a method of controlling the state of a suspension of solid particles in a liquid, comprising, applying to the suspension a stimulus adapted to control inter-particle attraction of the solid particles in the liquid, said stimulus being reversibly activatable to control attraction and/or repulsion of said particles in said liquid wherein said stimulus is applied for a sufficient time to provide the desired attraction or repulsion of particles.

In a preferred embodiment, the stimulus is a change in pH and/or a change in temperature. The Applicant has surprisingly found that the application of a stimulus such as pH change or temperature change can reversibly control attraction and/or repulsion of particles within the liquid. The Applicant has noted that it is the chemistry of the suspension that controls interactions between the individual particles. These interactions which may be repulsive or attractive, control the behaviour of the particles in the suspensions such as settling rate, final sediment height and moisture levels, compressive yield strength and shear flow properties such as shear yield stress and viscosity.

In another preferred embodiment the stimulus is exposure to light e.g. ultraviolet, UV or visible light, exposure to darkness, i.e. masking/shielding from light and/or a change in the wavelength of light exposure. The Applicant has found that application of such a stimulus either instead of or in addition to pH and/or change in temperature can reversibly control attraction and/or repulsion of particles within the liquid. Such exposure to light/darkness and/or manipulation of the wavelength of light can occur artificially or in some cases may occur naturally. For instance, in the process of refining Bauxite to alumina application of light may naturally occur in a conventional thickener due to sunlight. Accordingly, if a photosensitive flocculant is added to the top of the thickener where the solids concentration approaches zero, light will easily penetrate the top section of the thickener and stimulate flocculation. The density of the resulting sediment bed, however, will be high enough to make the sediment opaque and accordingly light cannot penetrate into the sediment. The state of the suspension will then revert to dispersed and the settlement will consolidate further.

In a further embodiment, the chemistry of the suspension may be altered by adding a chemical additive such as a polymer that is stimulant sensitive. The addition of such a stimulant sensitive chemical increases the sensitivity and ability to control the state of the suspension using the aforementioned applied stimulus, e.g. change of pH, change of temperature exposure to light and/or manipulation of wavelength or light. In still a further embodiment, the stimulus comprises a stimulant sensitive polymer.

The present invention strives to improve dewatering efficiencies and produce both improved sedimentation of fine particles and dense sediment beds and filter cakes by controlling the inter-particle forces in the suspension. By controlling the inter-particle forces between the solid particles in suspension, it is possible to control the behaviour of the suspension during each stage of a separation process. The invention provides the use of a stimulus to alter the inter-particle forces e.g. from repulsive to attractive and back to repulsive.

Application of the stimulus as mentioned above causes the suspension to separate into a solids-rich phase and a liquids-rich phase. These two phases can then be separated in accordance with conventional technology, to undergo further processing.

For instance, in one example, the inter-particle forces of the solid particles may first be controlled to be attractive, such that the particles aggregate and thereby decrease settling times. The resulting sediment can then be removed by a thickener, filter or other device. Alternatively, the liquid above the sediment can be removed/decanted soon after rapid sedimentation, as is current best practice.

The remaining high solids suspension (solids-rich phase) may undergo further consolidation by then reverting the inter-particle forces back to repulsion, i.e. removing or reversing the stimulus which caused the attraction. This allows any liquid remaining in the sediment to be expressed and recovered after waiting a suitable period of time for additional consolidation. As will be clear to persons skilled in the art, it is currently not possible to recover such additional fluid utilizing conventional techniques.

As will be clear to persons skilled in the art, the present invention provides a technique for controlling the state of a suspension and thereby improving the efficiency of later techniques for separating the solid particulate material. Controlling attraction/repulsion of the particles improves sedimentation both in speed and recovery, and further allows control over the solids concentration of the sediment, filter cake or thickener underflow. In addition to the greater solids concentration in the dewatered product, a dewatered product should also have a lower viscosity due to the repulsive forces between the particles, which may result in improvements in pumping the dewatered product to the next process operations.

In preferred embodiments, the stimulus used to control the inter-particle forces can include pH, temperature, exposure to light (or darkness) and/or manipulation of wavelength or light as discussed above. As an example, pH may be increased or decreased to create aggregation or repulsion. The pH stimulus may be applied without a chemical additive such that as the pH nears the isoelectric point of the suspension, the inter-particle forces become attractive. As the pH moves away from the isoelectric point, these inter-particle forces become repulsive.

Similarly, temperature may be either increased or decreased and/or the suspension and be subjected to exposure and/or manipulation of wavelength(s) or light to create aggregation or repulsion.

If chemical additives are used, it is preferable that a single chemical additive be chosen rather than a mixture of chemical additives. To explain, a single chemical additive may be selected which can act as a flocculant (inter-particle attraction) or a dispersant (inter-particle repulsion) depending upon the application of certain process parameters. This is to be preferred over separate chemical additives for flocculation and dispersion as it provides simplicity both in the materials added to the suspension but also reduces the need for additional mixing steps.

A particularly preferred stimulus sensitive polymer is a polyelectrolyte, which in certain embodiments may be anionic or cationic. The polymer is preferably one that adsorbs to the surface of the particle and in a sufficient quantity to create steric or electrosteric repulsion between the particles.

In one embodiment, the polyelectrolyte is selected such that it is soluble at pH values where it is charged and poorly soluble at pH values where it has little charge. Accordingly, it will be clear to persons skilled in the art that by changing to a pH where the polyelectrolyte has little charge attraction and resultant flocculation will occur.

Preferably the polyelectrolyte is one or combination of the following polymers: chitosan, polyacrylic acid, polyacrylamides and derivatives thereof, polymethacrylic acid, polystyrene sulfonate, polysulfonamide poly(2-vinylpyridine) and others described in the Journal of Controlled Release, 15, 141 (1991) incorporated herein by reference, polysaccharides such as xanthan, carragenan, agarose, agar, pectin, guar gum and others described in Lapasin and Pricl, Reology of Industrial Polysaccharides: Theory and Application, Blackie Academic and Professional, 1994, incorporated herein by reference.

In an alternative embodiment, the polymer may be temperature sensitive such that it is soluble at low temperatures and poorly soluble or gels at higher temperatures. Alternatively, the temperature sensitive polymer may be chosen such that it is soluble at high temperature or gels at low temperature.

Suitable temperature sensitive polymers include one or a combination of the following polymers: poly(N-isopropylacrylamide) (poly(NIPAM)), co-polymers of poly NIPAM with other polymers such as polyacrylic acid, polyethylene oxide, poly propylene oxide, methylcellulose, ethyl hydroxyethyl cellulose, carboxymethyl cellulose, hydrophobically modified ethyl hydroxyethyl cellulose, and other related polymers, gelatine, agarose, agar, pectin, carragenan, xanthan gum, guar gum and others described in Guent, J., "Thermoreversible Gelation of Polymers and Biopolymers", Academic Press, 1992, and Lapasin and Pricl, "Reology of Industrial Polysaccharides: Theory and Application", Blackie Academic and Professional, 1994, both of which are incorporated herein by reference.

In still another embodiment, the additive may be a photosensitive molecule or polymer. Exposing photosensitive molecules to either UV or visible light causes them to change molecular configuration such that their solubility in water is either increased or reduced. Subsequent absence of light (darkness) causes the molecule to revert to its original configuration. In many cases, the water-soluble configuration of the molecule has an open form and the corresponding hydrophobic configuration has a closed form. Polymers containing photosensitive molecules and derivatives of photosensitive molecules are also suitable additives for creating light stimulated flocculation and consolidation. Suitable polymers for the inclusion of photosensitive units into the side chains include polypeptides, such as lysine, glutamic acid, poly acrylamides, polyelectrolytes and other water-soluble molecules. Photosensitive units that may be included as side groups on the polymer chains include spyropyran, spyrooxazine and similar molecules as described in Bouas-Laurent and Durr, "Organic Photochromism", *Pure Appl. Chem.*, Vol. 73, 639-665 (2001) and Pieroni, Fissi and Popova, "Photochromic Polypeptides", *Prog. Polym. Sci.*, Vol. 23, 81-123 (1998), both of which are incorporated herein by reference. Another class of photosensitive molecules changes from the hydrophilic to the hydrophobic form in aqueous solution when the wavelength of light is changed from the visible to the ultraviolet. Polymers responsive to this sort of stimulus include, poly dimethylacrylamide/N-4-phenylazophenylacrylamide (DMAAm) and poly dimethylacrylamide/4-phenylazophenylacryate (DMAA).

In still another embodiment of the invention, copolymers may be useful to aid in the adsorption of the stimulant sensitising agent to the particles. Copolymers are molecules that contain two or more different type of monomers. The two types of monomers may be alternated either randomly, alternatively or in blocks. The use of block copolymers that contain one block that strongly adsorbs to the surface of the particles and another block that is sensitive to pH, temperature or light would be particularly useful. Examples of such polymers include: poly ethyleneoxide-poly propyleneoxide-poly ethyleneoxide triblock copolymers (such as Pluronics polymers manufactured by BASF). In this case the polypropylene oxide would enhance adsorption to particles particularly hydrophobic particles such as coal and coal tailings, while the poly ethyleneoxide blocks would produce steric repulsion at lower temperatures (near room temperature) and would tend to associate at higher temperatures resulting in aggregation. Other types of useful block copolymers are comb polymers, which have a backbone that enhances adsorption to the particles and teeth that are stimulus sensitive. One example of this type of polymer contains poly acrylic acid as the backbone and poly ethylene oxide as the teeth.

As it would be clear to a person skilled in the art, the stimulus may be applied or removed to create attraction and/or repulsion in accordance with the process requirements. It is suitable for a variety of processes including simple, solid/liquid separation, water clarification, and aid in mineral processing or to produce rapid dewatering.

In yet another embodiment, if aggregation occurs by another, for example, conventional, technique the stimulus may only be applied following production of the sediment bed to thereby induce repulsion, further densification and consolidation of the filter cake and greater recovery of the clarified liquid from a filter press, for example, as discussed above.

In another aspect, the present invention provides a method of consolidating a sediment bed including applying to the bed a stimulus adapted to promote inter-particle repulsion in the sediment bed, and applying said stimulus for a sufficient time to liberate at least some of the liquid trapped within the bed and allow further settling/consolidation of the particles in the sediment bed Once again, this application of the method to consolidate a sediment bed can be conducted using a variety of stimulus including pH or temperature change exposure to light or darkness and manipulation of light wavelength, with or without chemical additive. In regard to the chemical additive, it will be understood that it will be difficult to provide thorough mixing of a chemical additive to a sediment bed. Accordingly, if such consolidation of the sediment bed is required, it is preferred that the appropriate chemical additive be added to the suspension prior to formation of the sediment bed.

The present invention also provides a method of separating solid particles from a liquid including applying the aforementioned methods for a time sufficient to provide a solids-rich phase and a liquids-rich phase, and then separating the two phases.

There are a number of different ways in which the present invention may be used to promote and assist in solid/liquid separation.

BRIEF DESCRIPTION OF DRAWINGS

The present invention will now be described by way of example only with reference to the accompanying drawings and Examples. Each of FIGS. 1 to 42 shows a number of test tubes. Each tube is identified by a number that corresponds to the Example in which the photo is featured and a letter representing its position in the photo. From left to right the letter designation increases alphabetically and all tubes are referenced according to the following captions.

BEST MODE FOR CARRYING OUT THE INVENTION

Figure 1:
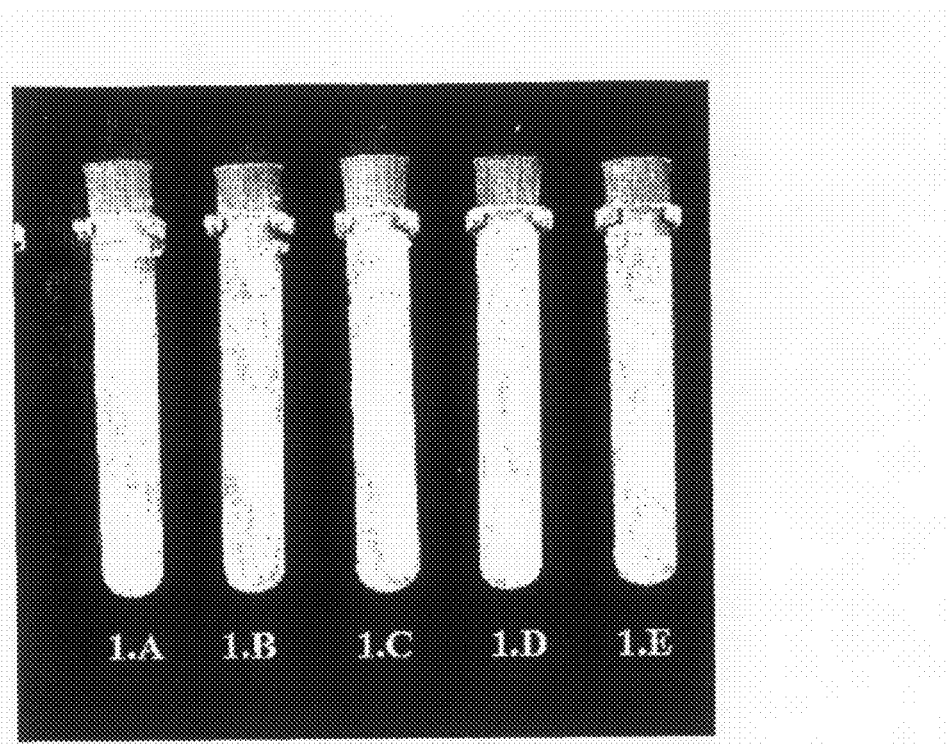
FIG. 1. Alumina suspensions 15 min after the start of sedimentation. Tube 1.A is at pH 4, tube 1.B is at pH 6, tube 1.C is at pH 8.8, tube 1.D is at pH 8.8, tube 1.E is at pH 8.8.

The present invention will now be described with reference to FIGS. 1 to 42 and Examples 1 to 12, which exemplify control of the inter-particle forces in a suspension using an applied stimulus, in accordance with the invention. In these cases, the stimulus applied is pH and/or temperature and/or chemical additives.

The invention provides a process whereby the inter-particle forces may be controlled between attraction and repulsion using an applied stimulus. The following discussion will relate to an example whereby the applied stimulus firstly creates attraction and aggregation of the solid particles so that they settle rapidly. In the examples, after the solids and liquids have been separated (by aggregation and settlement of the solid particles between which attractive forces apply) into a primary solids-rich phase and primary liquids-rich phase, by means well known in the field, the inter-particle forces are selectively switched to repulsive. This repulsion allows the solids-rich phase to settle/consolidate further and, in the process, expel more liquid to provide a secondary liquids-rich phase and a secondary solids-rich phase that is higher in solids content, i.e. greater consolidation, than the primary solids-rich phase.

Generally, sedimentation and consolidation of the solid particles may be performed under the influence of gravity. However, additional applied forces such as centrifugal force, pressure or vacuum, may be applied in use.

There are a variety of methods for controlling the inter-particle forces to be either attractive or repulsive. As discussed below, these methods can involve the attraction or repulsion of the solid particles in a fluid with or without the use of chemical additives.

By way of background, particles that have repulsive forces between each other remain as individual particles in the liquid. When the particles are very small (less than about 20 µm) they have very little mass and will settle very slowly under the influence of gravity. However, when the particles do eventually settle the resulting sediment bed is quite dense. These suspensions consolidate to relatively high volume fractions of solids (low moisture contents) even at low applied consolidation pressures.

Suspensions of particles interacting with long-range repulsive pair potentials are referred to as dispersed or stabilized and generally have low viscosities, low yield stresses and liquid-like behavior.

When there are attractive forces between particles the particles are pulled together to form aggregates. The aggregates have much larger mass than the individual particles (as they typically contain thousands or more primary particles) and thus they settle much more rapidly than the individual particles. The sediment beds that form unfortunately are of relatively low density and contain high residual moisture contents. These suspensions require high pressures to consolidate to higher volume fractions when compared to the same particles interacting with repulsive forces. Suspensions of particles interacting with strongly attractive pair potentials generally have high viscosities, high yield stresses and elastic-like behavior.

Attractive forces can be created by reducing the surface charge of the particles to near nothing by either adjusting the pH to near the isoelectric point (pH at which the surface charge is neutalised) or by adding electrolyte to neutralize the surface charge (coagulation). A bridging attraction can be created by particles by the addition of a high molecular weight polymer that adsorbs to more than one particle.

There are typically two methods of creating repulsion between particles. First, the Electrical Double Layer (EDL) method can be used by adjusting solution conditions so that there is a similar surface charge on the all the particles. Surface charge is usually created either by adjusting the pH to values away from the isoelectric point (pH where the particles are neutral) or by adding a charged species that adsorbs to the particles. Similarly charged particles repel each other and oppositely charged particles attract.

The second method, "steric repulsion" relies on the adsorption of a polymer on the particles surface that is soluble in the suspending fluid. The polymer must be adsorbed in sufficient quantity to completely cover the surface of the particles. The polymer extending out from the surface creates a cushion that prevents particles from coming together (repulsion). The polymers that work best in creating steric repulsion are typically low to moderate molecular weight. (About 2,000 to 1,000,000 MW.) Electrosteric stabilization occurs when the polymer creating the steric repulsion is also charged so as to create an EDL repulsion. The addition of surfactants may also be used to create repulsion between particles and stable suspensions.

In one embodiment of the invention, the natural van der Waals attraction between the particles can be used to create attraction/agglomeration of the particles. This is done by adjusting the pH to the isoelectric point of the particles. At this point, the particles will aggregate and settle to the bottom of the container. Once the particles have formed a sediment bed and consolidated to the maximum extent that is possible under the attractive force, the pH can be adjusted to a value away from the isoelectric point so that repulsion will result. The sediment bed will then undergo further consolidation by expelling any liquid trapped within the sediment bed. Examples 1 to 3 illustrate the use of pH to switch between van der Waals attraction and electrical double layer repulsion for several different minerals.

EXAMPLES

Example 1

Figure 2:
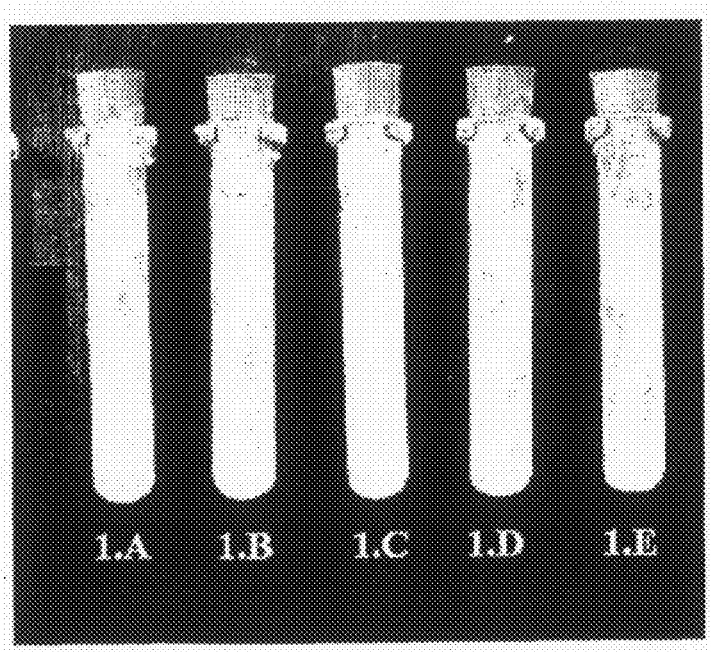
FIG. 2. Alumina suspensions 120 min after the start of sedimentation. Tube 1.A is at pH 4, tube 1.B is at pH 6, tube 1.C is at pH 8.8, tube 1.D is at pH 8.8, tube 1.E is at pH 8.8.
Figure 3:
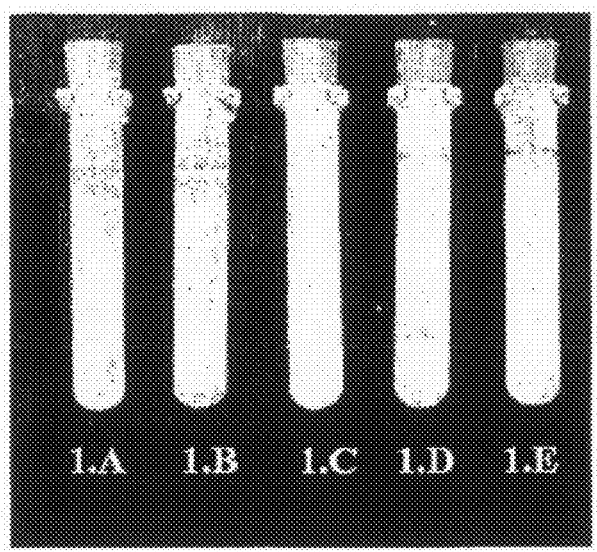
FIG. 3. Alumina suspensions 89 h after the start of sedimentation. Tube 1.A is at pH 4, tube 1.B is at pH 6, tube 1.C is at 8.8, tube 1.D was at pH 8.8 for 2 h then at pH 3.5, tube 1.E was at pH 8.8 for 2 h then at pH 6.0.
Figure 4:
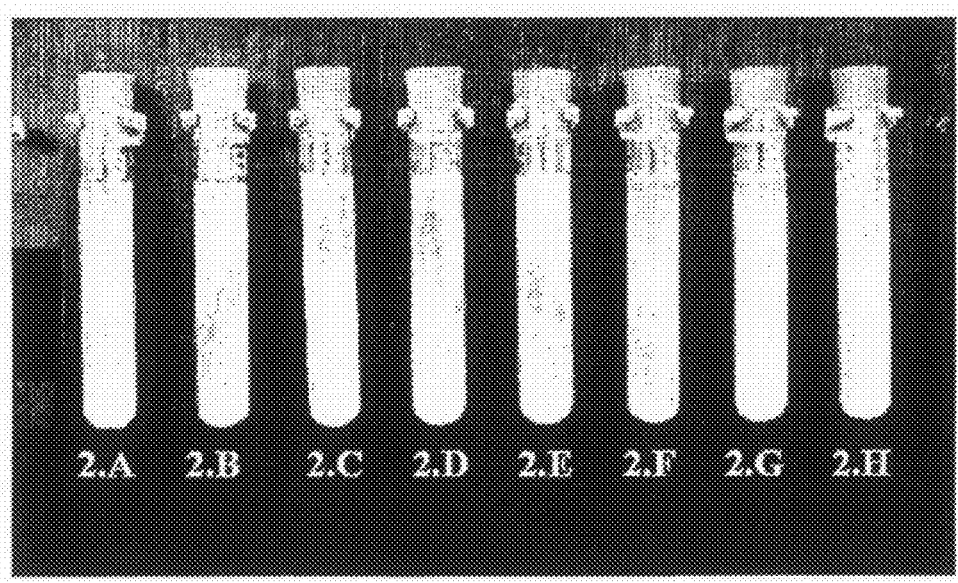
FIG. 4. Silica suspensions after 15 min of sedimentation. Tube 2.A is at pH 5, tube 2.B is at pH 7, tube 2.C is at pH 3.8, tube 2.D is at pH 3.8, tube 2.E is at pH 3.8, tube 2.F is at pH 3.25, tube 2.G is at pH 3.25 and tube 2.H is at pH 3.25.
Figure 5:
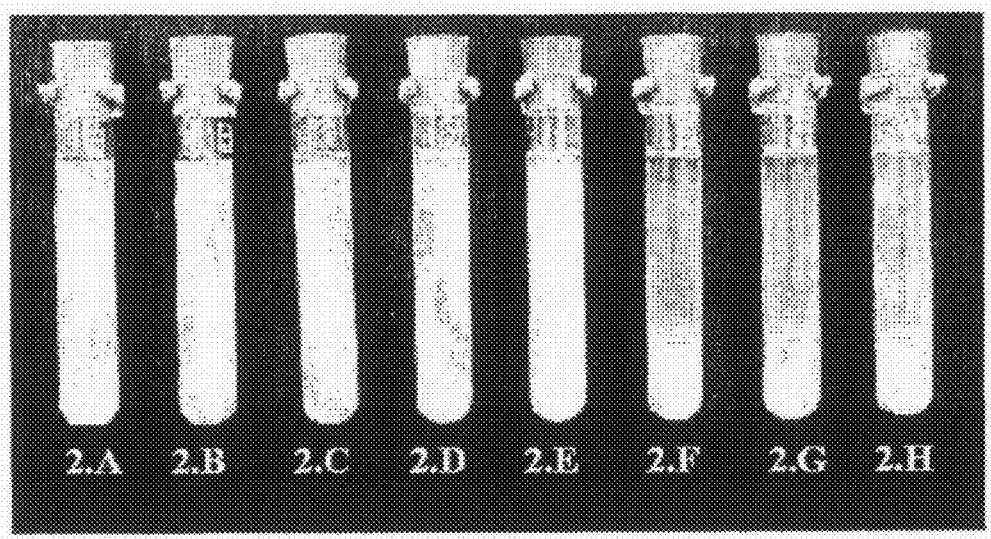
FIG. 5. Silica suspensions after 60 min of sedimentation. Tube 2.A is at pH 5, tube 2.B is at pH 7, tube 2.C is at pH 3.8, tube 2.D is at pH 3.8, tube 2.E is at pH 3.8, tube 2.F is at pH 3.25, tube 2.G is at pH 3.25 and tube 2.H is at pH 3.25.
Figure 6:
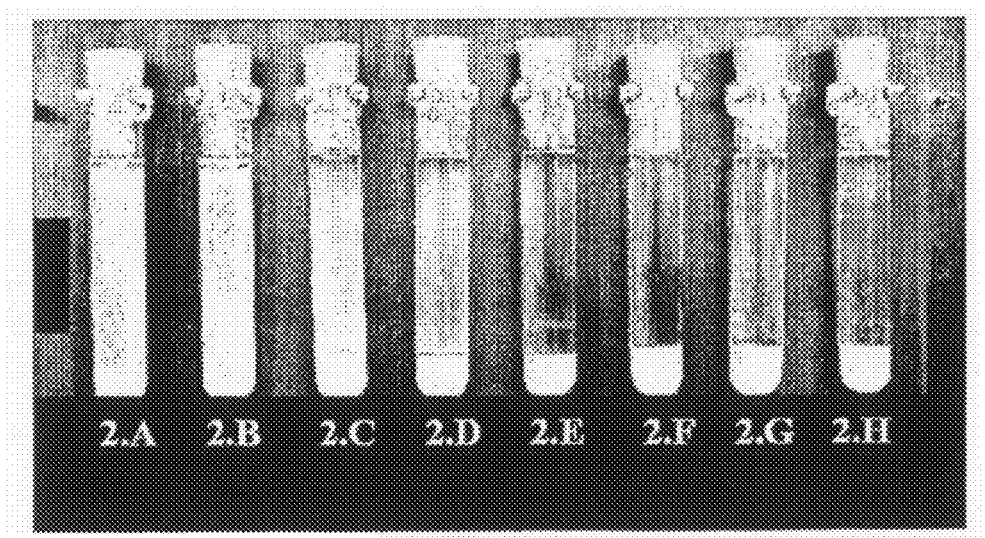
FIG. 6. Silica suspensions after 22 h of sedimentation. Tube 2.A is at pH 5, tube 2.B is at pH 7, tube 2.C is at pH 3.8, tube 2.D was at pH 3.8 for 1 hour then at pH 4.7, tube 2.E was at pH 3.8 for 1 hour then at pH 10.5, tube 2.F is at pH 3.25, tube 2.G was at pH 3.25 for 1 hour then at pH 7.0 and tube 2.H was at pH 3.25 for 1 hour then at pH 10.2.
Figure 7:
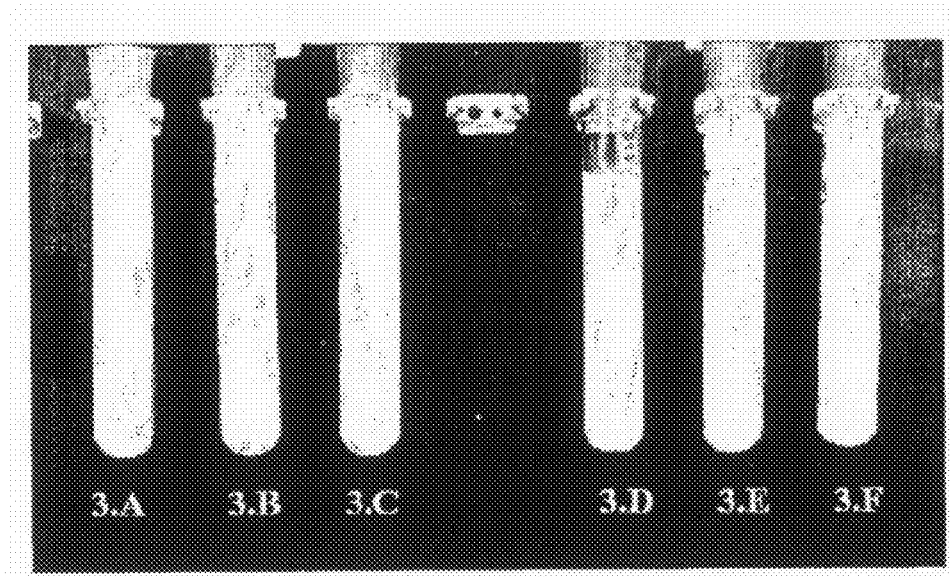
FIG. 7. Tube 3.A contains titania at pH 4.3; tubes 3.B and 3.C contain titania at pH 7.5. Tube 3.D contains zircon at pH 9.2; tubes 3.E and 3.F contain titania at pH 4.0. The photo was taken 15 min after settling began.
Figure 8:
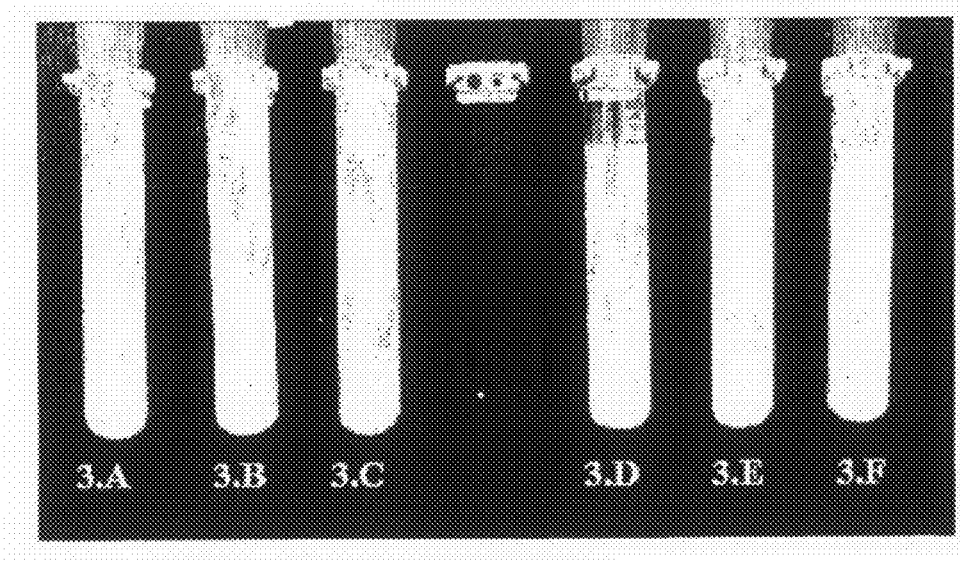
FIG. 8. Tube 3.A contains titania at pH 4.3; tubes 3.B and 3.C contain titania at pH 7.5. Tube 3.D contains zircon at pH 9.2; tubes 3.E and 3.F contain titania at pH 4.0. The photo was taken 2 h after settling began.
Figure 9:
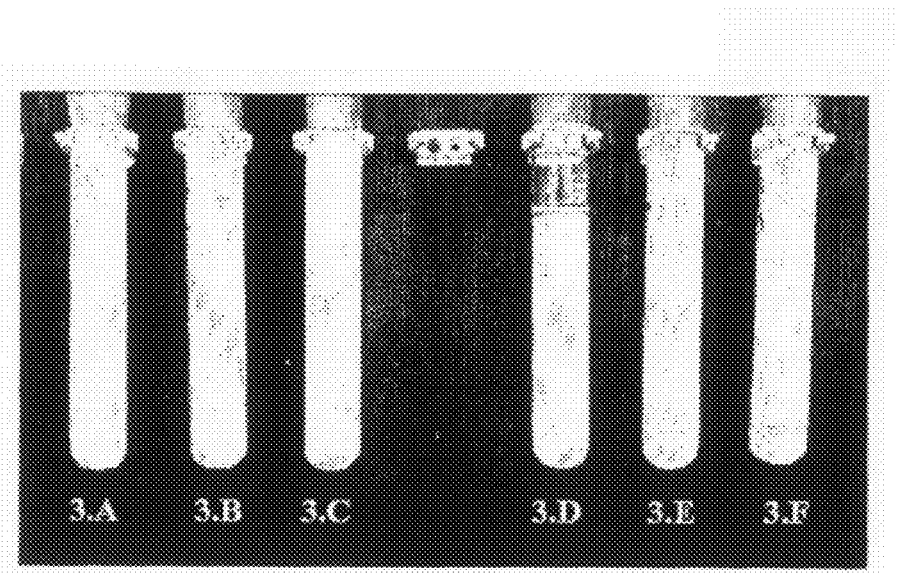
FIG. 9. Tube 3.A contains titania at pH 4.3; tube 3.B contains titania at pH 7.5; tube 3.C contains titania that was at pH 7.5 for 2 h then at pH 4.3. Tube 3.D contains zircon at pH 9.2; tube 3.E contains titania at pH 4.0; tube 3.F contains zircon that was at pH 4.0 for 2 h then at pH 9.2. The photo was taken 24 h after settling began.
Figure 10:
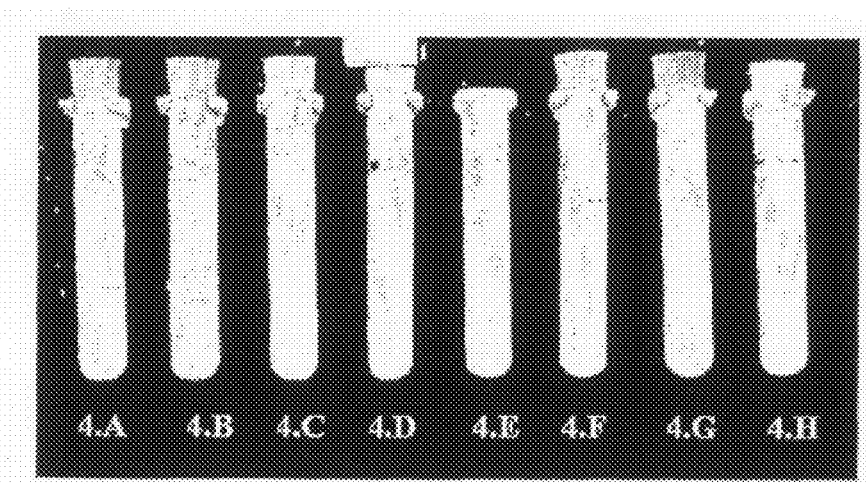
FIG. 10. 10% w/w alumina suspensions with 750,000 MW poly acrylic acid (PAA) at pH 8.0 after 60 min settling. Tube 4.A contains 0.05% of PAA by wt of alumina; tube 4.B contains 0.1% of PAA by wt of alumina; tube 4.C contains 0.2% of PAA by wt of alumina; tube 4.D contains 0.3% of PAA by wt of alumina; tube 4.E contains 0.4% of PAA by wt of alumina; tube 4.F contains 0.5% of PAA by wt of alumina; tube 4.G contains 1.0% of PAA by wt of alumina; tube 4.H contains 0.25% of PAA by wt of alumina.
Figure 11:
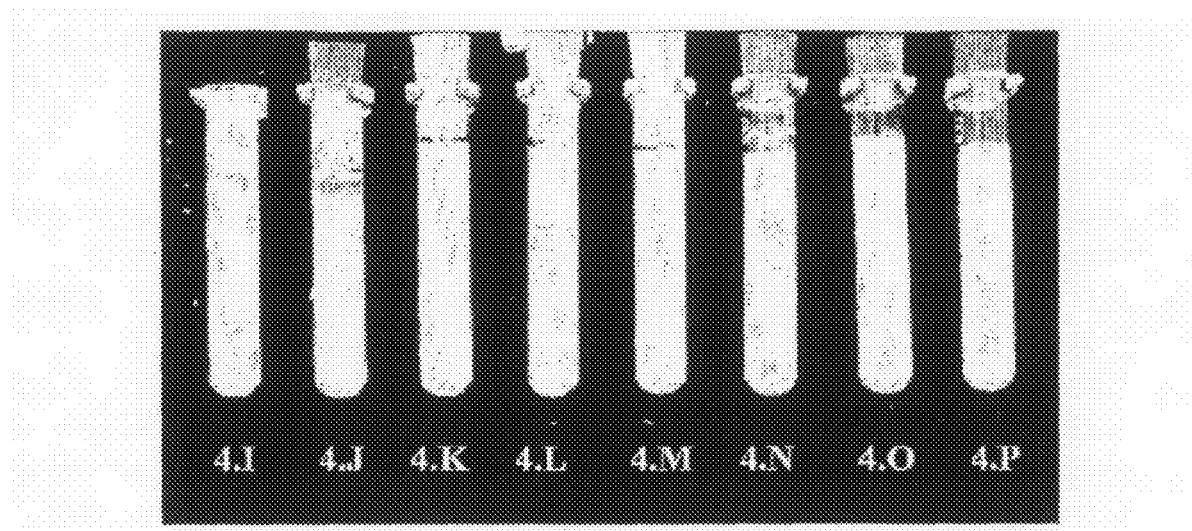
FIG. 11. 10% w/w alumina suspensions with 250,000 MW poly acrylic acid (PAA) at pH 8.0 after 60 min settling. Tube 4.I contains 0.05% of PAA by wt of alumina; tube 4.J contains 0.1% of PAA by wt of alumina; tube 4.K contains 0.2% of PAA by wt of alumina; tube 4.L contains 0.3% of PAA by wt of alumina; tube 4.M contains 0.4% of PAA by wt of alumina; tube 4.N contains 0.5% of PAA by wt of alumina; tube 4.O contains 1.0% of PAA by wt of alumina; tube 4.P contains 2.0% of PAA by wt of alumina.
Figure 12:
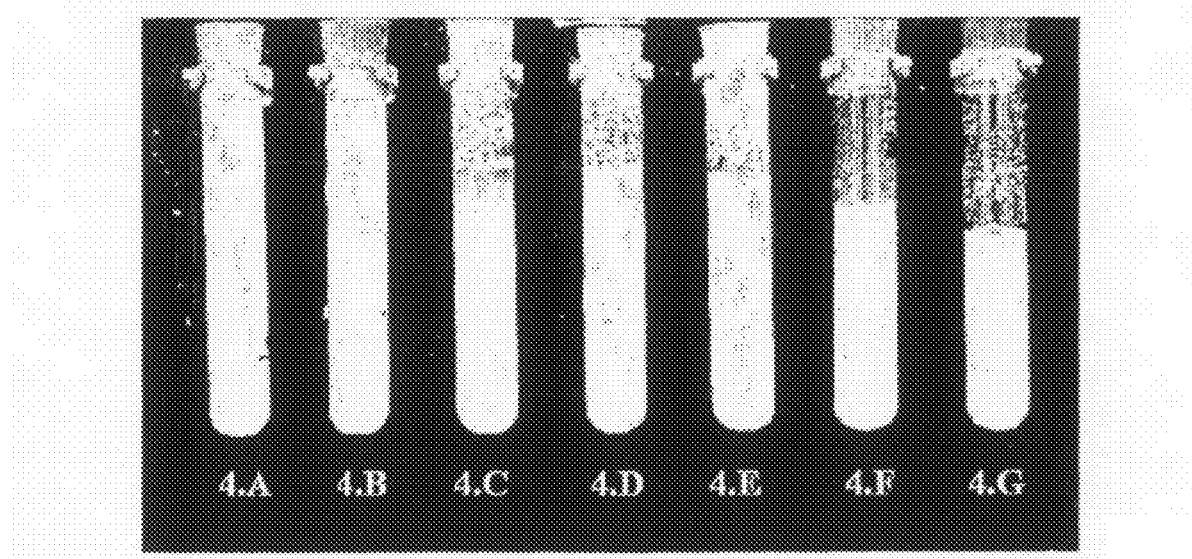
FIG. 12. 10% w/w alumina suspensions with 750,000 MW poly acrylic acid (PAA) at pH 3.0 after 10 min settling. Tube 4.A contains 0.05% of PAA by wt of alumina; tube 4.B contains 0.1% of PAA by wt of alumina; tube 4.C contains 0.2% of PAA by wt of alumina; tube 4.D contains 0.3% of PAA by wt of alumina; tube 4.E contains 0.4% of PAA by wt of alumina; tube 4.F contains 0.5% of PAA by wt of alumina; tube 4.G contains 1.0% of PAA by wt of alumina.
Figure 13:
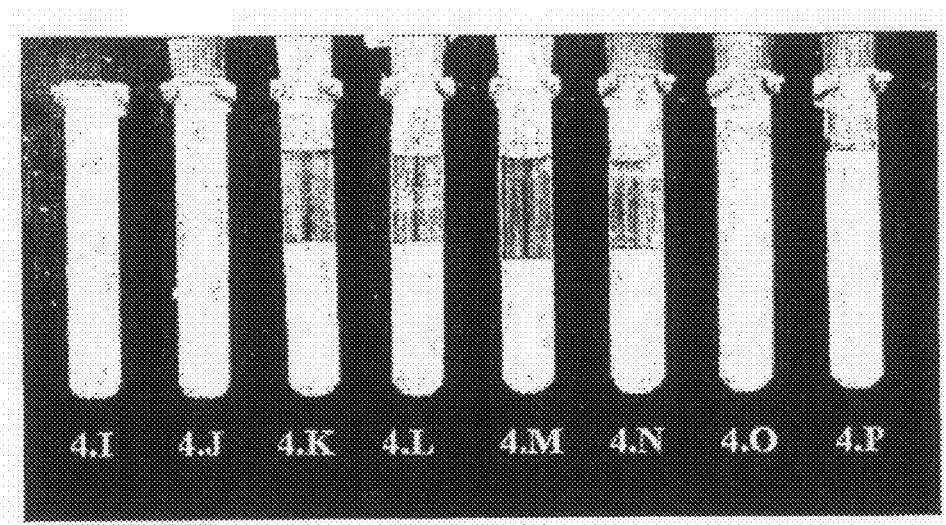
FIG. 13. 10% w/w alumina suspensions with 250,000 MW poly acrylic acid (PAA) at pH 3.0 after 30 min settling. Tube 4.I contains 0.05% of PAA by wt of alumina; tube 4.J contains 0.1% of PAA by wt of alumina; tube 4.K contains 0.2% of PAA by wt of alumina; tube 4.L contains 0.3% of PAA by wt of alumina; tube 4.M contains 0.4% of PAA by wt of alumina; tube 4.N contains 0.5% of PAA by wt of alumina; tube 4.O contains 1.0% of PAA by wt of alumina; tube 4.P contains 2.0% of PAA by wt of alumina.
Figure 14:
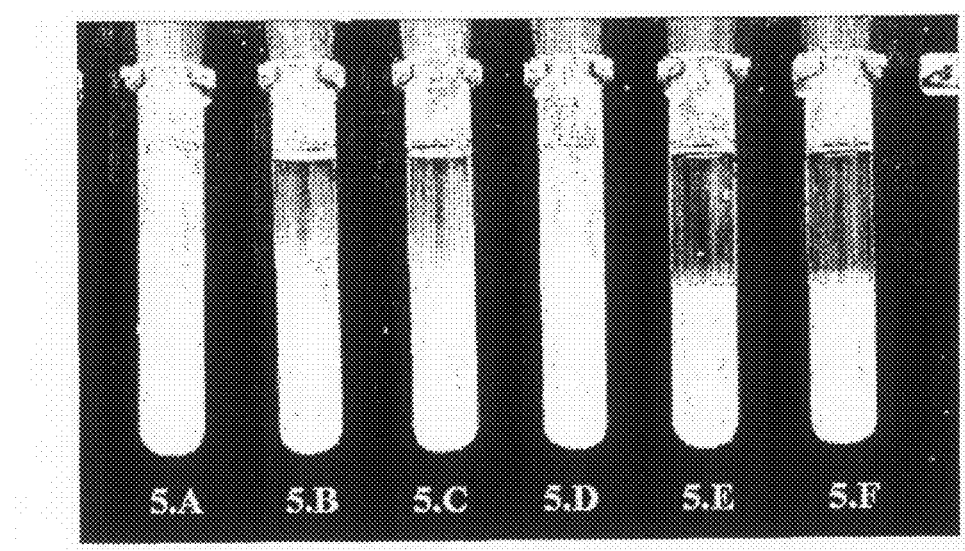
FIG. 14. 10% w/w alumina suspensions after 30 min of settling. Tubes 5.A, 5.B, and 5.C contain 0.4% of 250,000 MW PAA by weight of alumina. Tubes 5.D, 5.E, and 5.F contain 0.4% of 750,000 MW PAA by weight of alumina. Tubes 5.A and 5.D are at pH 8.0 while tubes 5.B, 5.C, 5.E, and 5.F are at pH 3.5.
Figure 15:
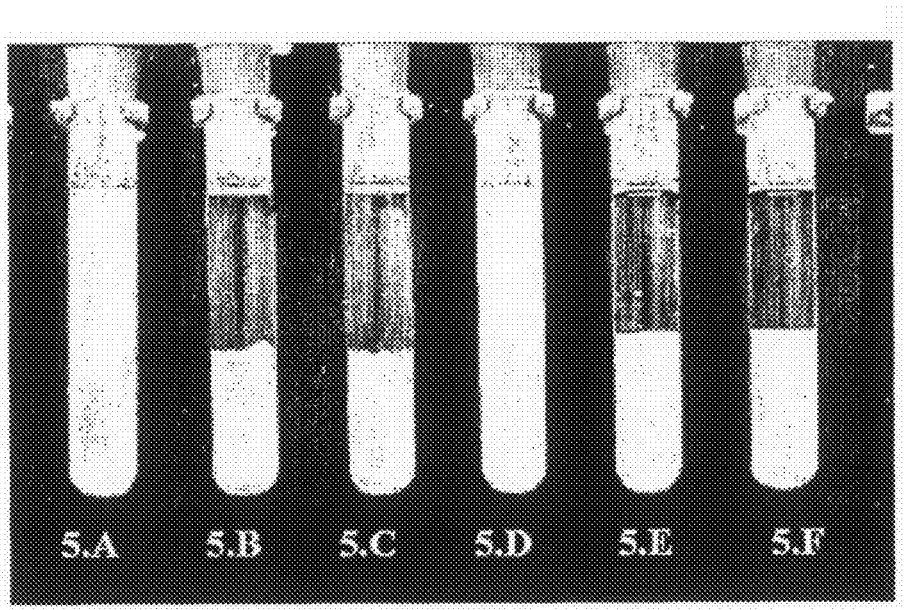
FIG. 15. 10% w/w alumina suspensions after 90 min of settling. Tubes 5.A, 5.B, and 5.C contain 0.4% of 250,000 MW PAA by weight of alumina. Tubes 5.D, 5.E, and 5.F contain 0.4% of 750,000 MW PAA by weight of alumina. Tubes 5.A and 5.D are at pH 8.0 while tubes 5.B, 5.C, 5.E, and 5.F are at pH 3.5.
Figure 16:
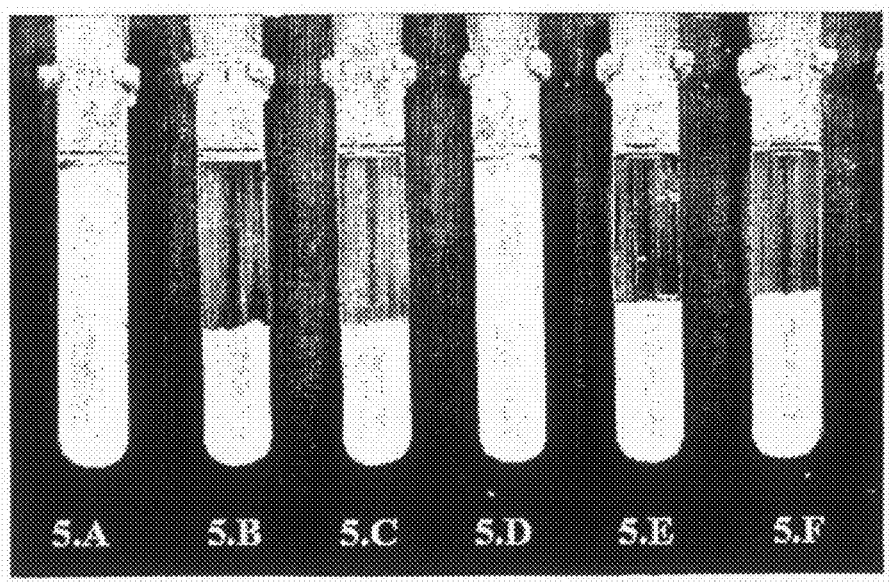
FIG. 16. 10% w/w alumina suspensions after 48 h of settling. Tubes 5.A, 5.B, and 5.C contain 0.4% of 250,000 MW PAA by weight of alumina. Tubes 5.D, 5.E, and 5.F contain 0.4% of 750,000 MW PAA by weight of alumina. Tubes 5.A and 5.D were kept at pH 8.0 the entire time; tubes 5.B and 5.E were kept at pH 3.5 the entire time; tube 5.C was at pH 3.5 for 2 h then at pH 8.5; tube 5.F was at pH 3.5 for 90 min then at pH 8.5.
Figure 17:
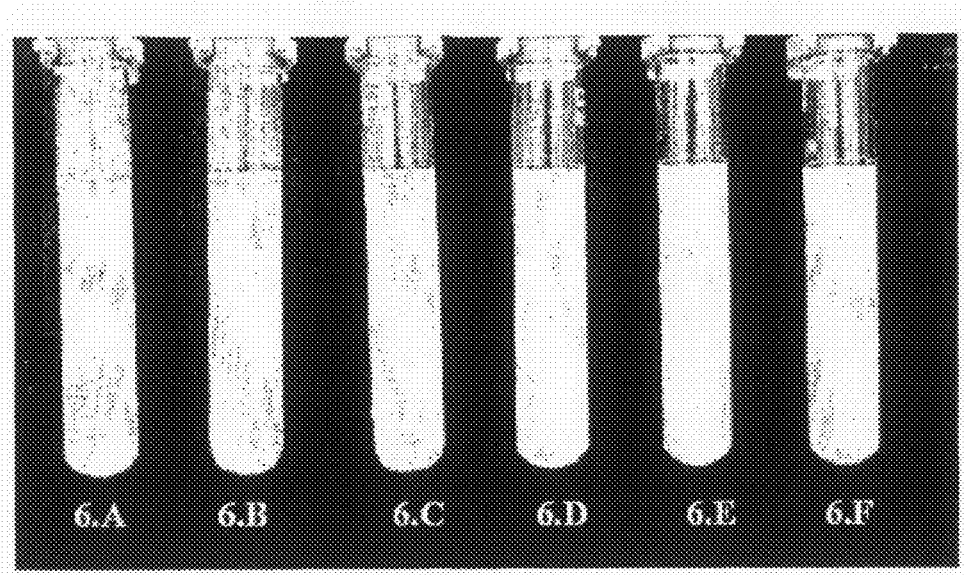
FIG. 17. 3% w/w silica suspensions at pH 4.5 after 90 min of settling. Tube 6.A contains 0.1% chitosan by weight of silica; tube 6.B contains 0.25% chitosan; tube 6.C contains 0.5% chitosan; tube 6.D contains 1.0% chitosan; tube 6.E contains 1.5% chitosan; tube 6.F contains 2.0% chitosan.
Figure 18:
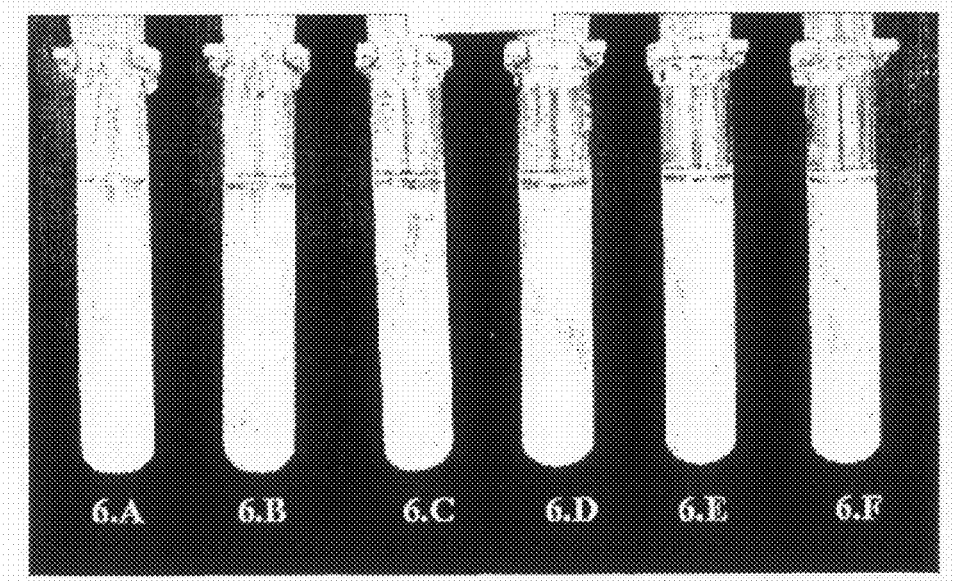
FIG. 18. 3% w/w silica suspensions at pH 4.5 after 18 h of settling. Tube 6.A contains 0.1% chitosan by weight of silica; tube 6.B contains 0.25% chitosan; tube 6.C contains 0.5% chitosan; tube 6.D contains 1.0% chitosan; tube 6.E contains 1.5% chitosan; tube 6.F contains 2.0% chitosan.

Electrical Double Layer, pH, Stimulated Flocculation and Consolidation of Alumina A commercial high purity alpha alumina powder (AKP-30, Sumitomo Corp. Japan) with a average particle size of about 0.3 µm and a density of 3.97 g cm$^{-3}$ was dispersed in deionised water as a 10% w/w suspension at its natural pH near 6. Each of five test tubes of approx. 60 mL volume was filled with 50 g of the 10% w/w alumina suspension. Tube 1.A was adjusted to pH 4.0 with HCl. Tube 1.B was adjusted to pH 6.0 with KOH. Tube 1.C, 1.D, and 1.E were adjusted to pH 8.8. The isoelectric point of alumina powder is about pH 9 and at pH below 7 significant positive surface charge results (Franks and Meagher, 2003). The suspensions in the tubes at pH 4 and 6 remained suspended for at least 89 h while the suspensions in the tubes at pH 8.8 rapidly aggregated and settled out. (See FIGS. 1, 2 and 3). After 2 h of sedimentation the rate of settling had decreased significantly in the tubes at pH 8.8 (FIG. 2). After 2 h, the pH of tube 1.D. was adjusted to 3.5 and the pH of tube 1.E was adjusted to pH 6.0. After 24 h the sediment volume of tube 1.D had decreased slightly compared to tubes 1.C and 1.E. FIG. 3, shows the tubes after 89 h of sedimentation. The sediment volume of tube 1.D was 12.01 mL while the sediment volume of tube 1.C was 14.49 mL. The sediment volume of tube 1.E was 14.52 mL, nearly the same as tube 1.C. Changing the pH of the suspension in tube 1.D to 3.5 created a significant double layer repulsion that allowed the sediment to slowly consolidate more than the tubes at higher pH values. The similar sediment volumes of tubes 1.C (pH 8.8) and 1.E (pH 6.0) indicates that reducing the pH only to 6.0 was not sufficient to develop a large enough surface charge to re disperse the alumina particles in tube 1.E, thus no additional consolidation was noted compared to tube 1.C.

Example 2

Electrical Double Layer, pH, Stimulated Flocculation and Consolidation of Silica Silica (ground quartz, 99% pure) with an average particle size of approximately 2 µm was purchased from Sigma Aldrich. 10% w/w silica was dispersed in distilled water. Each of eight test tubes of approx. 60 mL volume was filled with 50 g of the 10% w/w silica suspension. Tube 2.A was adjusted to pH 5.0 with HCl. Tube 2.B was adjusted to pH 7.0 with KOH. Tubes 2.C, 2.D and 2.E was adjusted to pH 3.8 with HCl. Tubes 2.F, 2.G, and 2.H were adjusted to pH 3.25 with HCl. The suspensions in the tubes at pH 5 and 7 remained stable for at least 22 h, while the suspension in the tubes at pH 3.8 and 3.25 rapidly aggregated and settled out (see FIGS. 4, 5 and 6). The isoelectric point (IEP) of silica is at about pH 3.0; at pH above 5 significant negative surface charge develops (Tadros and Lyklema, 1968).

The surface charge creates an electrical double layer repulsion at pH 5 and above resulting in the stable suspensions; while at pH below 4 (near the IEP) there is insufficient surface charge to stabilize the silica and rapid aggregation results due to van der Waals attraction (Israelachvili, 1992; Hunter, 2001). After 60 min of settling the rate of sedimentation had slowed considerably and the sediments in tubes 2.C, 2.D, 2.E, 2.F, 2.G, and 2.H occupied about 20 to 25% of the tubes volume (see FIG. 5). The pH of tube 2.D was adjusted to pH 4.7. The pH of tube 2.E was adjusted to pH 10.5. The pH of tube 2.G was adjusted to pH 7.0. The pH of tube 2.H was adjusted to pH 10.2. The increase in pH increased the surface charge of the silica in the sediments and an electrical double layer repulsion was created. Sedimentation was allowed to continue. After 22 h the final sediment volume of the tubes that had been adjusted to pH above 10 was significantly less than the tubes that had been kept at pH between 3 and 4 (see FIG. 6, and Table 1)

Only the tubes that were adjusted to above pH 10 sowed any significant sediment consolidation compared to the tubes kept at pH near the IEP. This suggests that the adjustment of the pH up to only pH 4.7 to 7.0 was not sufficient to develop a great enough surface charge to redisperse the sediments in the tubes. Thus little additional consolidation occurred in tubes 2.D and 2.G compared to the tubes kept at pH near the IEP.

TABLE 1

| Tube number | Sediment volume after 22 h |
| --- | --- |
| 2.C | 7.44 mL |
| 2.D | 6.75 mL |
| 2.E | 6.18 mL |
| 2.F | 8.35 mL |
| 2.G | 8.35 mL |
| 2.H | 7.46 mL |

Example 3

Electrical Double Layer, pH, Stimulated Flocculation and Consolidation of Titania and Zircon A submicron titania powder (CR826 from Kerr-McGee Chemical, Oldahoma City, USA) with an isoelectric point (IEP) of about pH 7.8 was prepared as a 10% w/w suspension at pH about 7.5. Each of three test tubes of approx. 60 mL volume was filled with 50 g of the 10% w/w titania suspension. Tube 3.A was adjusted to pH 4.3 with HCl. Tubes 3.B and 3.C were kept at pH 7.5.

A zircon powder was obtained from Opacfine, Australia. It had a density of about 4.4 g cm$^{-3}$, about 6 µm average size and an isoelectric point (IEP) of about pH 3.8. It was prepared as a 10% w/w suspension in water at pH about 4.0. Each of three test tubes of approx. 60 mL volume was filled with 50 g of the 10% w/w zircon suspension. Tube 3.D was adjusted to pH 9.2 with KOH. Tubes 3.E and 3.F were kept at pH 4.0.

All six tubes were shaken vigorously for about 30 sec and set in a rack and allowed to sediment while photos were taken occasionally. Tubes 3.A (titania, pH 4.3) and 3.D (zircon, pH 9.2), far away from their respective IEPs, remained dispersed for over 24 h, while tubes 3.B and 3.C (titania, pH 7.5) and tubes 3.E and 3.F (zircon, pH 3.8), near their IEPs, rapidly aggregated and settled (see FIGS. 7-9.) After nearly 2 h of settling the rate of sedimentation decreased dramatically. The pH of tube 3.C was decreased to pH 4.3 by the addition of HCl. The pH of tube 3.F was increased to pH 9.2 with KOH. The settling was allowed to continue. After 24 h of settling the sediment volume of tube 3.C was less than tube 3.B and the sediment volume of tube 3.F was less than tube 3.E (see FIG. 9, and Table 2)

TABLE 2

| Tube number | Sediment volume after 24 h |
| --- | --- |
| 3.A | Did not settle |
| 3.B | 10.77 mL |
| 3.C | 8.62 mL |
| 3.D | Did not settle |
| 3.E | 4.38 mL |
| 3.F | 3.80 mL |

In suspensions where there is more than one type of particles that have different isoelectric points, the pH can be adjusted to a value between the isoelectric points of the two types of particles to create aggregation by so-called heterocoagulation. Heterocoagulation is caused by an electrical double layer attraction between oppositely charged particles.

After the aggregated particles are removed from the bulk of the liquid, the pH can then be adjusted to a value where both types of particle have a large magnitude charge density of the same size to create a repulsion, as discussed above.

The method that uses only electrical double layer repulsion and van der Waals attraction, however, is usually not the best practice in industrial applications since the solids of interest are typically mixtures of several different types of particles that have different isoelectric points. Furthermore the aggregates created are often small and slow settling.

A second method, known as bridging flocculation is usually preferred since it produces aggregates that settle more rapidly than coagulation and charge neutralization and it produces larger aggregates. In this method a polymer that adsorbs onto the particles surface is added in a quantity that is less than sufficient to fully cover the surface. The polymer chains that extend from one particles surface can then adsorb on another particles surface and hold them together. The optimum amount of polymer to add is usually just enough to cover half of the total particle surface area. The best bridging flocculation is usually found with polymers of moderate to very high molecular weight. (Typically 100,000 to 20,000,000 MW). In many cases the same polymer can produce either bridging flocculation or steric repulsion depending on the concentration used.

Unlike the prior art, however, the present invention provides a reversible type flocculation, which is absent from conventional bridging flocculations. The process of the present invention can produce either attraction or repulsion in between particles at the desired time and be able to switch back and forth. With conventional bridging flocculation, once the polymer has been added and flocculation occurs, it is not possible to reverse the attraction to repulsion.

Examples 4 to 10

Polyelectrolyte Addition

One of the preferred embodiments of the invention disclosed in this application relies on the use of a polyelectrolyte to aid in the development of larger rapid settling aggregates. The polyelectrolyte should be added in appropriate quantity so that it adsorbs to the particles and creates an electrosteric stabilization of the suspension. The appropriate quantity depends upon the particle surface area, charge density, and polymer properties.

Those skilled in the art would be able to determine the appropriate dose for any particular combination of particle and polymer system. See for instance Examples 4 and 6 below. The polyelectrolyte chosen should have the ability to act as both a dispersant and a flocculant. The preferred molecular weight range for a polymer to be able to act as both is about from 100,000 to 1,000,000, although it may be possible to use the method described in this application over a wider range of polymer molecular weights.

In Examples 4 and 5, when an anionic polyelectrolyte is used the polymer is negatively charged at high pH, while at low pH it becomes neutral. An anionic polyelectrolyte would typically be used when the particles have a high isoelectric point so that they would be positively charged over much of the pH range. Examples 4 and 5 demonstrate the use of the anionic polyelectrolyte poly acrylic acid for the sedimentation and consolidation of alumina.

Example 4

Flocculation and Restabilisation of Alumina with the Negatively Charged Polyelectrolyte Poly Acrylic Acid High purity alumina was purchased form Sumitomo Co. Japan (AKP-30 Alumina). The alumina had an average particle size of about 0.3 μm and an isoelectric point at pH 9. 10% w/w suspensions were prepared in deionised water at pH 8.0. Two different molecular weights (250,000 and 750,000) of poly acrylic acid were obtained from Aldrich Chemicals. The 250,000 MW polymer was prepared as a 0.5% w/w solution in deionised water at pH 8.0 by dissolving overnight. The 750,000 MW polymer was prepared as a 0.25% w/w solution at pH 8.0 by dissolving overnight.

Each of sixteen test tubes of approx. 60 mL volume was filled with 40 g of the 10% w/w alumina suspension at pH 8.0. The 750,000 MW Poly acrylic acid solution was added to the first 8 tubes in the following dosages as % w/w of solid particles: tube 4.A, 0.05%; tube 4.B, 0.1%; tube 4.C, 0.2%; tube 4.D, 0.25%; tube 4.E, 0.3%; tube 4.F, 0.4%, tube 4.G, 0.5%; and tube 4.H, 1.0%. The 250,000 MW poly acrylic acid solution was added to the next 8 tubes in doses as % w/w per weight of solid as following: tube 4.I, 0.05%; tube 4.J, 0.1%; tube 4.K, 0.2%; tube 4.L 0.3%; tube 4.M, 0.4%; tube 4.N, 0.5%; tube 4.O, 1.0% and tube 4.P, 2.0%. The tubes were allowed to settle for 17 h while taking photographs. The particles in the tubes that contained between 0.05 and 0.1% poly acrylic acid (both molecular weights) flocculated rapidly, and the aggregates settled. Within an hour significant sedimentation had occurred although the rate of sedimentation was not very fast (see FIGS. 10 and 11). After 17 h of sedimentation the suspensions at the highest concentrations of added polyacrylic acid remained stable. It appeared that about 0.3 wt % of the 250,000 MW poly acrylic acid or more was sufficient to restabilise the alumina while about 0.4% w/w of the 750,000 MW polymer was needed to restabilise the alumina.

At pH 8 the poly acrylic acid is highly negatively charged and the alumina is weakly positively charged. The polymer would be expected to adsorb strongly on the particles. The results indicate that the optimum flocculation of alumina with poly acrylic acid occurs at a concentration of about 0.1% w/w polymer per weight of solid. Stable alumina suspensions can be produced by adding higher concentrations of poly acrylic acid; greater than about 0.3% w/w for 250,000 MW poly acrylic acid and greater than about 0.4% w/w 750,000 MW poly acrylic acid. These suspensions are stabilized by an electrosteric mechanism due to the high surface coverage of highly charged polyelectrolyte.

The pH of the tubes was then adjusted to pH 3.0 with HCl. The suspensions with between about 0.2 to 0.5% w/w of polymer rapidly aggregated and settled out (see FIGS. 12 and 13). The rate of sedimentation was greater for the larger molecular weight polymer indicating that larger aggregates were formed. This occurs since at pH 3 the polymer is not charged. Thus van der Waals interactions can cause the particles to be attracted to each other. Stable suspensions were formed for both polymers for concentrations less and equal to 0.1% w/w. The polymer only covers at most about half the surface of the particles at these low concentrations and is not charged. The high positive charge on the alumina at this low pH is sufficient to stabilize the suspensions due to electrical double layer repulsion.

Example 5 pH Induced Flocculation and Consolidation of Alumina with Poly Acrylic Acid

Based on the result of Example 4 a concentration of 0.4% w/w poly acrylic acid and alumina would be a good choice for demonstration of this invention. High purity alumina was purchased form Sumitomo Co. Japan (AKP-30 Alumina). The alumina had an average particle size of about 0.3 µm and an isoelectric point at pH 9. 10% w/w suspensions were prepared in deionised water at pH 8.0. Two different molecular weights (250,000 and 750,000) of poly acrylic acid were obtained from Aldrich Chemicals. The 250,000 MW polymer was prepared as a 0.5% w/w solution in deionised water at pH 8.0 by dissolving overnight. The 750,000 MW polymer was prepared as a 0.25% w/w solution at pH 8.0 by dissolving overnight.

150 g each of alumina suspensions were prepared with 10% w/w solid alumina and 0.4% by weight of solid of each of the polymers (250,000 and 750,000 MW). Three test tubes (5.A, 5.B and 5.C) of approx. 60 mL volume was filled with 50 g of the 10% w/w alumina suspension with 0.4% 250,000 MW poly acrylic acid at pH 8.0. Tube 5.A was kept at pH 8.0. Tube 5.B and 5.C were adjusted to pH 3.5 with HCl. Another three test tubes (5.D, 5.E and 5.F) of approx. 60 mL volume was filled with 50 g of the 10% w/w alumina suspension with 0.4% 750,000 MW poly acrylic acid at pH 8.0. Tube 5.D was kept at pH 8.0. Tube 5.E and 5.F were adjusted to pH 3.5 with HCl. The tubes were shaken gently for about 15 sec and allowed to settle for 48 h while photographs were taken over the period of time (see FIGS. 14, 15 and 16).

The suspensions at pH 3.5 rapidly aggregated and settle out leaving a clear supernatant. The aggregation was induced at pH 3.5 where the polymer is only slightly negatively charged. Under these conditions the polymer coated particles are neutral and van der Waals attraction draws them together into aggregates. The rate of sedimentation was slightly faster for the larger polymer. Within a matter of 30 min the sediments occupied less than about 50% of the tubes volume (see FIG. 14). The suspensions at pH 8.0 remained stable for up to 48 h (see FIG. 16). At pH 8 the polyacrylic acid is highly charged and creates electrosteric repulsion between the alumina particles.

After 90 min. consolidation in tube 5.F (750,000 MW) dramatically slowed and the pH was adjusted to pH 8.5 with KOH. After 2 h consolidation in tube 5.C (250,000 MW) dramatically slowed and the pH was adjusted to pH 8.5 with KOH. Sedimentation was observed as it was allowed to continue. Adjusting the pH up to 8.5 has the result of causing the polymer to become highly negatively charged again and recreating a repulsion between the particles. The rate of sedimentation in tubes 5.C and 5.F increased slightly compared to tubes 5.B and 5.D. After 48 h the suspensions that had been at pH 8.0 the entire time remained stable with particles remaining suspended. The sediments that had been changed to 3.5 and then to 8.5 (tubes 5.C and 5.F) occupied less volume than the corresponding sediments that had remained at pH 3.5 (tubes 5.B and 5.E) (see FIG. 16 and Table 3).

TABLE 3

| Tube number | Sediment volume after 48 h |
| --- | --- |
| 5.A | N/A stable dispersion |
| 5.B | 19.31 mL |
| 5.C | 17.09 mL |
| 5.D | N/A stable dispersion |
| 5.E | 22.94 mL |
| 5.F | 20.72 mL |

Examples 6 to 10

Cationic Polyelectrolyte

When a cationic polyelectrolyte is used the polymer is positively charged at low pH and becomes neutral as pH is increased. Cationic polyelectrolytes would usually be used when the particles have low isoelectric point and are negatively charged over much of the pH range. Examples 6, 7, and 8 show the use of chitosan (cationic polyelectrolyte) as a stimulant sensitive flocculant and consolidating aid for silica.

Example 6

Flocculation and Restabilisation of Silica with the Positively Charged Polyelectrolyte Chitosan Silica (ground quartz, 99% pure) with an average particle size of approximately 2 µm was purchased from Sigma Aldrich. 6% w/w silica was dispersed in distilled water. The pH was adjusted to 5.0 with HCl. Low molecular weight (about 150,000 g/mole) chitosan was purchased from Fluka. The chitosan was dissolved as a 1% w/w solution in an approximately 1 mol L$^{-1}$ acetic acid solution in distilled water at pH 4.0. The chitosan was allowed to dissolve for more than three days. Chitosan is positively charged at low pH, but looses its charge as pH is increased. When it looses its charge it becomes hydrophobic and is only sparingly soluble in water (Varum et al., 1994).

Each of six test tubes of approx. 60 mL volume was filled with 21 g of the 6% w/w silica suspension. 20.87 g of distilled water was added to test tube 6.A. 0.13 g of the 1% w/w chitosan solution was then added to the tube. The resulting pH was approximately 4.5. The resulting suspension contained 3% w/w of silica and 0.1% w/w chitosan as weight per weight of silica at pH 4.5. 20.7 g of distilled water was added to test tube 6.B. 0.31 g of the 1% w/w chitosan solution was added to the tube. The resulting pH was approximately 4.5. The resulting suspension contained 3% w/w of silica and 0.25% w/w chitosan as weight per weight of silica at pH 4.5. 20.3 g of distilled water was added to test tube 6.C. 0.625 g of the 1% w/w chitosan solution was added to the tube. The resulting pH was approximately 4.5. The resulting suspension contained 3% w/w of silica and 0.5% w/w chitosan as weight per weight of silica at pH 4.5. 19.75 g of distilled water was added to test tube 6.D. 1.25 g of the 1% w/w chitosan solution was added to the tube. The resulting pH was approximately 4.5. The resulting suspension contained 3% w/w of silica and 1% w/w chitosan as weight per weight of silica at pH 4.5. 19.13 g of distilled water was added to test tube 6.E. 1.88 g of the 1% w/w chitosan solution was added to the tube. The resulting pH was approximately 4.5. The resulting suspension contained 3% w/w of silica and 1.5% w/w chitosan as weight per weight of silica at pH 4.5. 18.5 g of distilled water was added to test tube 6.F. 2.5 g of the 1% w/w chitosan solution was added to the tube. The resulting pH was approximately 4.5. The resulting suspension contained 3% w/w of silica and 2% w/w chitosan as weight per weight of silica at pH 4.5.

The five test tubes were shaken vigorously for approximately 30 sec and placed in a rack to allow the particles to settle. Photographs were taken occasionally over the day. After several minutes, sediment began to appear in tubes 6.A and 6.B, which contained 0.1 and 0.25% w/w chitosan respectively. The aggregates responsible for this increased sedimentation were too small to be observed by the naked eye (less than about 100 μm). These aggregates settled to the bottom of the tube within about 90 min (see FIG. 17.) The supernatant was not completely clear at any concentration investigated indicating that not all particles participated in the aggregation. Tubes 6.E and 6.F (containing 1.5 and 2.0% w/w chitosan respectively) did not appear to have aggregate formation and remained stable for up to at least 18 h (see FIG. 18.) Tubes 6.C and 6.D (containing 0.5 and 1.0% w/w chitosan respectively) had intermediate behaviour to the low and high concentration suspensions. This example illustrates that at low pH the positively charged chitosan will adsorb to negatively charged particles such as silica. When the concentration of chitosan is low (about 0.1 to 0.5% w/w) bridging flocculation will occur and the aggregates will settle out. Note that the aggregates size was small, the rate of settling still relatively slow and the supernatant was not completely clear. When higher concentrations of chitosan are used (more than 1% w/w) the particles surface becomes completely covered in polymer and the suspension is restabilised by the steric repulsion between the particles.

Typically, small and slow setting aggregates are created by methods that use natural Van der Waals attraction or electrical double layer attraction. Generally therefore, those skilled in the art prefer polymer flocculants for rapid solid-liquid separation. Polymeric flocculants usually produce larger and more rapid settling aggregates.

Example 7 pH Induced Flocculation and Consolidation of Silica with 2 Wt % Chitosan

Silica (ground quartz, 99% pure) with an average particle size of approximately 2 μm was purchased from Sigma Aldrich. 6% w/w silica was dispersed in distilled water. The pH was adjusted to 5.0 with HCl. Low molecular weight (about 150,000 g mol$^{-1}$) chitosan was purchased from Fluka. The chitosan was dissolved as a 1% w/w solution in an approximately 1 mol L$^{-1}$ acetic acid solution in distilled water at pH 4.0. The chitosan was allowed to dissolve for more than three days. Chitosan is positively charged at low pH, but looses its charge as pH is increased. When it looses its charge it becomes hydrophobic and is only sparingly soluble in water (Varum et al., 1994).

Each of five test tubes of approx. 60 mL volume was filled with 21 g of the 6% w/w silica suspension. 21 g of distilled water was added to test tube number 7.A. The pH was adjusted to 4.5 with HCl. The resulting suspension contained 3% w/w of silica in water at pH 4.5. 21 g of distilled water was added to test tube number 7.B. The pH was adjusted to 8.0 with KOH. The resulting suspension contained 3% w/w of silica in water at pH 8. 18.5 g of distilled water was added to test tube number 7.C. 2.5 g of the 1% w/w chitosan solution was added to the tube. The resulting pH was 4.5. The resulting suspension contained 3% w/w of silica and 2% w/w chitosan per weight of silica at pH 4.5. 18.5 g of distilled water was added to test tube number 7.D. 2.5 g of the 1% w/w chitosan solution was added to the tube. The resulting pH was 4.5. The pH was adjusted to 8 with KOH. The resulting suspension contained 3% w/w of silica and 2% w/w chitosan as weight per weight of silica at pH 8. 18.5 g of distilled water was added to test tube number 7.E. 2.5 g of the 1% w/w chitosan solution was added to the tube. The resulting pH was 4.5. The pH was adjusted to 8 with KOH. The resulting suspension contained 3% w/w of silica and 2% w/w chitosan as weight per weight of silica at pH 8.

The five test tubes were shaken vigorously for approximately 30 sec and placed in a rack to allow the particles to settle. Photographs were taken at frequent time intervals over the next several days. As demonstrated in Example 1 above, 2% w/w chitosan per weight of silica is sufficient to completely cover the particles resulting in electrosteric repulsion at low pH.

Figure 19:
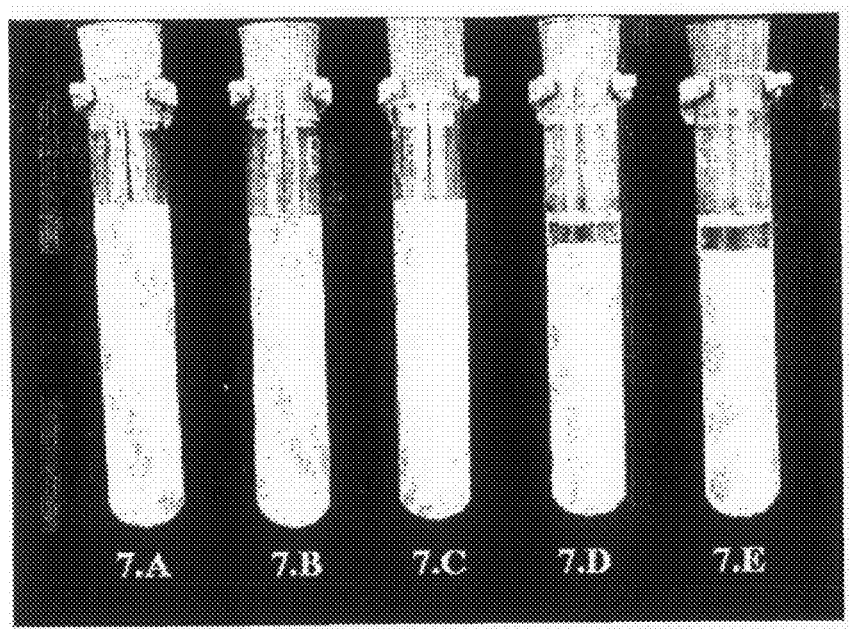
FIG. 19. 3% w/w silica suspensions after 1 minute of settling. Tube 7.A contains no chitosan at pH 4.5; tube 7.B contains no chitosan at pH 8.0; tube 7.C contains 2.0% chitosan by wt of silica at pH 4.5; tubes 7.D and 7.E contain 2.0% chitosan at pH 8.0.
Figure 20:
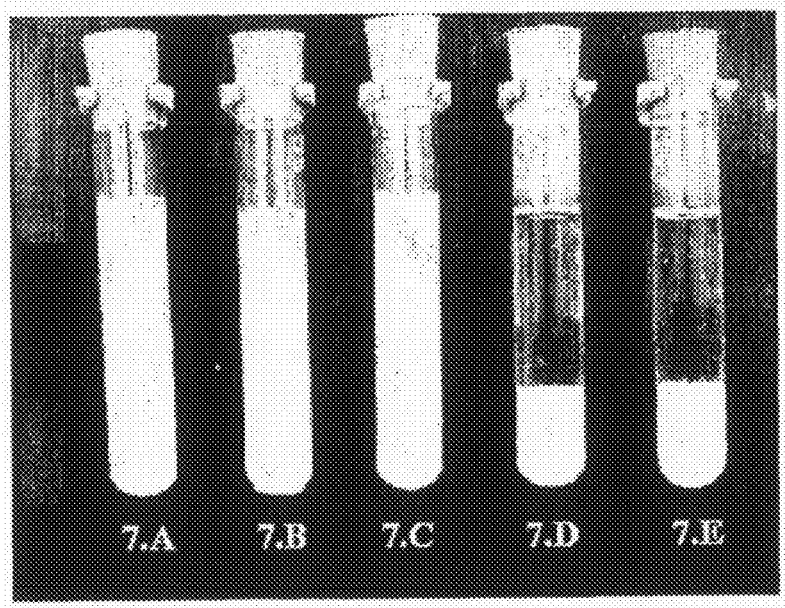
FIG. 20. 3% w/w silica suspensions after 10 min of settling. Tube 7.A contains no chitosan at pH 4.5; tube 7.B contains no chitosan at pH 8.0; tube 7.C contains 2.0% chitosan by wt of silica at pH 4.5; tubes 7.D and 7.E contain 2.0% chitosan at pH 8.0.

A quite dramatic difference was noted between tubes (7.A, 7.B and 7.C) and (7.D and 7.E) over the first 0 to 10 min. The particles in tubes 7.A, 7.B and 7.C did not appear to settle. These particles remained dispersed due to the repulsive forces between the particles. The particles in tubes 7.A and 7.B are stabilized by Electrical Double Layer repulsion and those in tube 7.C are stabilized by electrosteric stabilisation due to the positively charged chitosan adsorbed on the silica. The suspensions in tubes 7.D and 7.E on the other hand rapidly flocculated producing aggregates, which were visible to the naked eye and appeared to be between about 100 and 500 μm in size. These aggregates rapidly settled as indicated by FIGS. 19 and 20. Extremely clear supernatants resulted. The aggregation was initiated by the change in pH to pH 8. This change in pH neutralized the positive charge on the chitosan. Chitosan is positively charged at low pH but neutral (uncharged) at pH values above about 7.0. (Varum et al., 1994) The neutral chitosan is not very soluble in water (Varum et al., 1994) and attraction results between the chitosan molecules on neighbouring silica particles creating an attraction between the particles.

The sediments in tubes 7.D and 7.E continued to slowly consolidate. Within a matter of 10 min the sediment occupied less than 25% of the tube volume for tubes 7.D and 7.E while the suspensions in tubes 7.A, 7.B and 7.C appeared to have virtually no sediment formation, and the suspension occupied nearly 100% of the tube volume. After about 15 to 30 min the rate of consolidation in tubes 7.D and 7.E slowed dramatically reaching a plateau level (see FIG. 21). After 45 min of sedimentation the pH of tube 7.E was adjusted to pH 4.5 by the addition of HCl. One drop at a time of 1 mol L$^{-1}$ HCl was added and the pH monitored. One minute was waited between drops. It took about 10 min to reach pH 4.5. The change in pH back to pH 4.5 created a positive charge on the chitosan. The attraction between the silica particles at pH 8 has been changed to an electrosteric repulsion at pH 4.5. Sedimentation was allowed to continue. A slight haze appeared above the sediment bed due to the inevitable minor agitation that occurred as the acid was added. The aggregates in the top portion of the sediment of tube 7.E appeared to become reduced in size. The region of deflocculation appeared to slowly travel down to the bottom of the sediment bed over the period of about an hour. The sediment of tube 7.E began to consolidate at a faster rate than that of tube 7.D (see FIGS. 22 and 23.)

A noticeable sediment bed only began to appear in tubes 7.A, 7.B and 7.C after a period of about 45 min to an hour.

Figure 21:
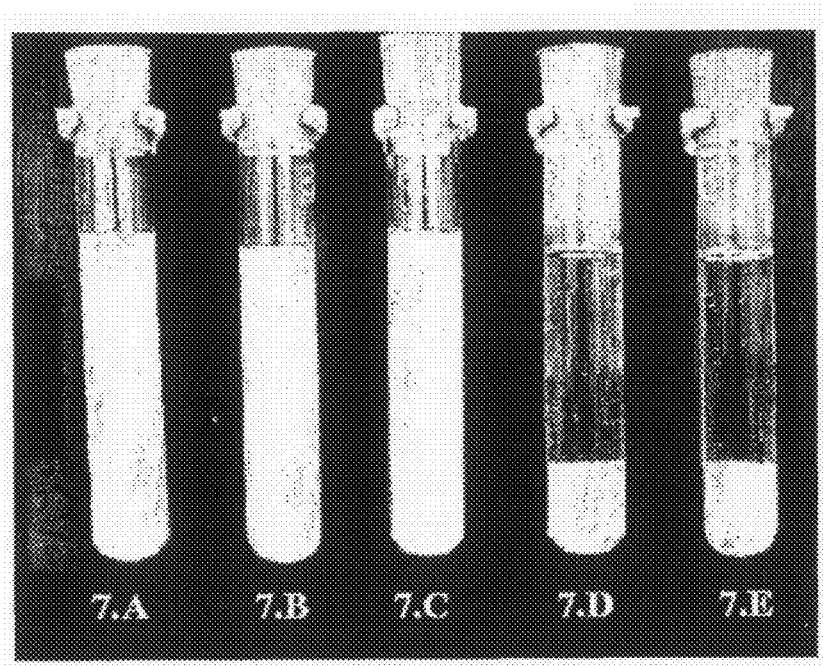
FIG. 21. 3% w/w silica suspensions after 30 min of settling. Tube 7.A contains no chitosan at pH 4.5; tube 7.B contains no chitosan at pH 8.0; tube 7.C contains 2.0% chitosan by wt of silica at pH 4.5; tubes 7.D and 7.E contain 2.0% chitosan at pH 8.0.
Figure 22:
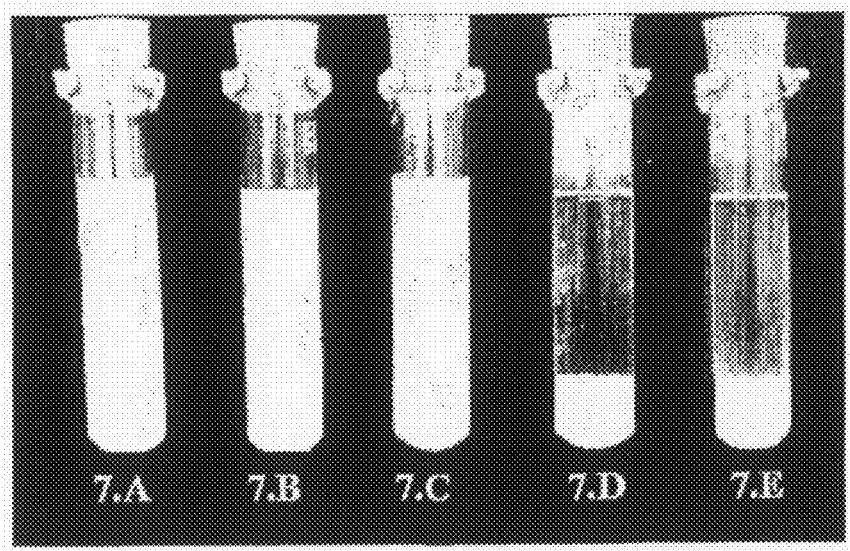
FIG. 22. 3% w/w silica suspensions after 90 min of settling. Tube 7.A contains no chitosan at pH 4.5; tube 7.B contains no chitosan at pH 8.0; tube 7.C contains 2.0% chitosan by wt of silica at pH 4.5; tube 7.D contains 2.0% chitosan and was at pH 8.0 for the entire time; tube 7.E contains 2.0% chitosan and was at pH 8.0 for 45 min then at pH 4.5.
Figure 23:
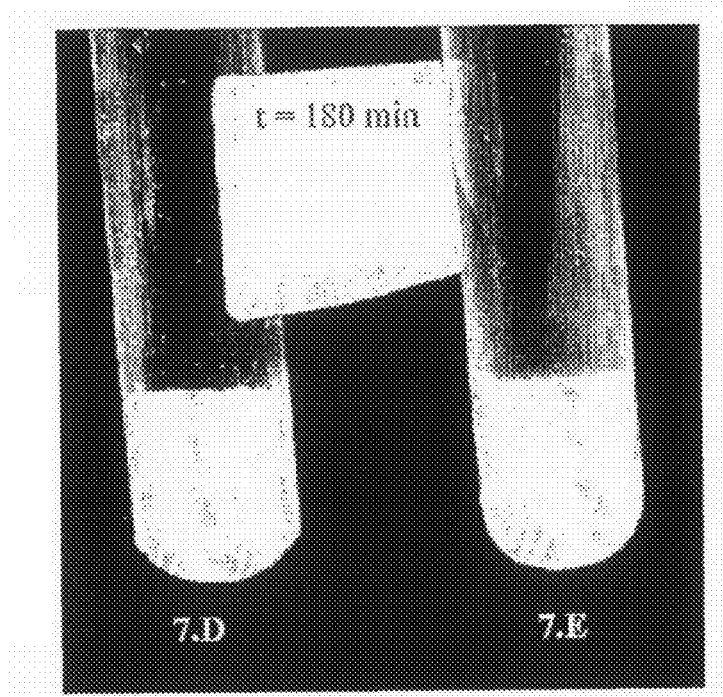
FIG. 23. 3% w/w silica suspensions after 180 min of settling. Tube 7.D contains 2.0% chitosan and was at pH 8.0 for the entire time; tube 7.E contains 2.0% chitosan and was at pH 8.0 for 45 min then at pH 4.5.
Figure 24:
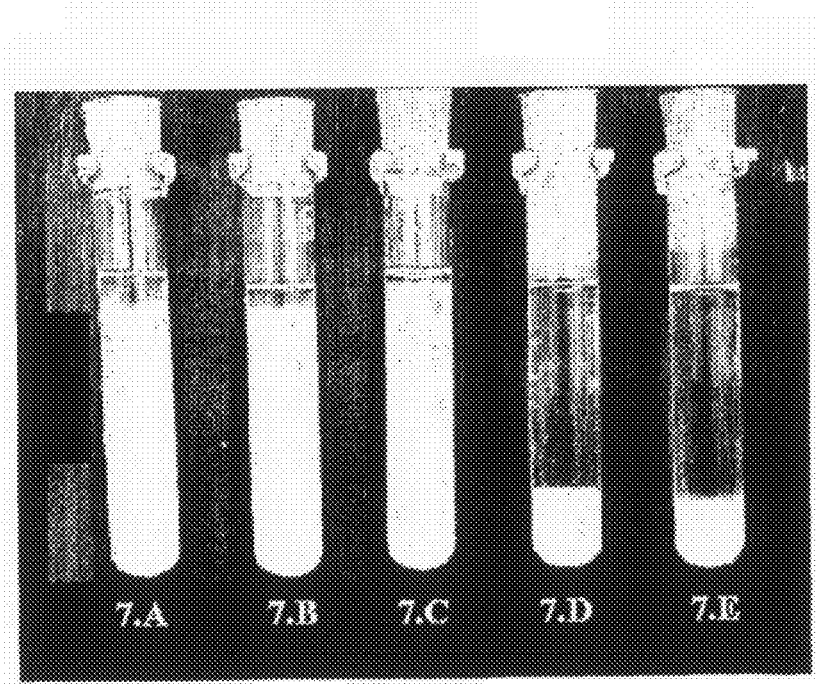
FIG. 24. 3% w/w silica suspensions after 24 h of settling. Tube 7.A contains no chitosan at pH 4.5; tube 7.B contains no chitosan at pH 8.0; tube 7.C contains 2.0% chitosan by wt of silica at pH 4.5; tube 7.D contains 2.0% chitosan and was at pH 8.0 for the entire time; tube 7.E contains 2.0% chitosan and was at pH 8.0 for 45 min then at pH 4.5.
Figure 25:
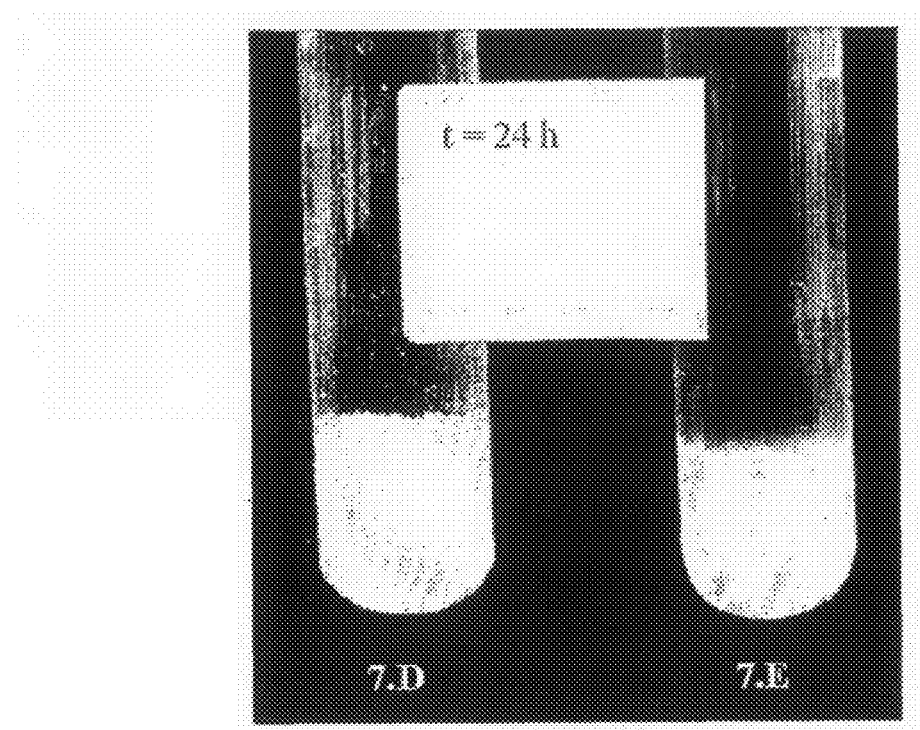
FIG. 25. 3% w/w silica suspensions after 24 h of settling. Tube 7.D contains 2.0% chitosan and was at pH 8.0 for the entire time; tube 7.E contains 2.0% chitosan and was at pH 8.0 for 45 min then at pH 4.5.

There was no clear supernatant and the high turbidity of the liquid above the sediment suggests that most particles were still dispersed in the upper part of tubes 7.A, 7.B and 7.C (see FIG. 21.) A small amount of clear supernatant was observed in tubes 7.A, 7.B and 7.C only after about 2 to 3 h. See FIG. 23.

The sediment in tube 7.E was clearly more consolidated than that in tube 7.D after about 3 h of sedimentation although there is a slight haze in tube 7.E just above the sediment.

After 24 h of sedimentation the sediment in tube 7.E occupies 5.64 mL of volume, while the sediment in tube 7.D occupied 10.26 mL of volume. See FIGS. 24 and 25. Although some sediment is building up in tubes 7.A, 7.B and 7.C there is still a very turbid suspension above the sediments in those tubes. See FIG. 24.

This example illustrates that both rapid sedimentation and high sediment density result when the inter-particle forces are made attractive to initiate sedimentation and then changed back to repulsive to allow the sediment to consolidate. The use of chitosan demonstrated that this concept has been reduced to practice for an adsorbing polymer that has charge and solubility that depends upon pH. In this way a simple change of pH can be uses as a stimulus to change the inter-particle forces.

Example 8 pH Induced Flocculation and Consolidation of Silica with 1 Wt % Chitosan

6% w/w silica suspension and 1% w/w chitosan solution were prepared as in Examples 6 and 7. Each of four test tubes was filled with 32 g silica suspension. 22 g of distilled water were added to tube number 8.A. 1.9 g of the 1% w/w chitosan solution was added. The resulting pH was 4.5. The resulting suspension contained 3.5% w/w silica and 1 wt % chitosan as weight per weight of silica at pH 4.5. 22 g of distilled water were added to tube number 8.B. 1.9 g of the 1% w/w chitosan solution was added. The pH was adjusted to 8.5. The resulting suspension contained 3.5% w/w silica and 1% w/w chitosan per weight of silica at pH 8.5. 22 g of distilled water were added to tube number 8.C. 1.9 g of the 1% w/w chitosan solution was added. The pH was adjusted to 8.5. The resulting suspension contained 3.5% w/w silica and 1% w/w chitosan as weight per weight of silica at pH 8.5. 22 g distilled water was added to tube number 8.D and the pH was adjusted to 4.5.

The four test tubes were shaken vigorously for approximately 30 sec and placed in a rack to allow the particles to settle. The sedimentation was observed visually. The results of Example 6 indicate that a concentration of 1% w/w chitosan is barely enough to completely cover the surface of the particles.

The particles in tubes 8.B and 8.C flocculated very rapidly to form aggregates that were visually estimated to be between 0.5 and 2 mm in size. They settled rapidly to the bottom of the tube. Within approximately 1 minute the sediment formed occupied about 25% of the volume of the tube. Over this time period no change was noted in tube number 8.D. Tube 8.D behaved the same as tube number 7.A in Example 7 for the remaining time of the experiment. Tube number 8.A appeared to have some particles that formed aggregates. These aggregates were deemed to be approximately 100 to 200 µm in size since they were just barely visible to the naked eye. These aggregates were likely caused by bridging flocculation of the silica with the chitosan.

The concentration used (1% w/w) is not quite enough to completely coat the surface of all the particles, thus some bridging of particles resulted while some particles remained as individuals. The aggregates in tube 8.A settled and formed a sediment bed over the period of about 20 to 30 min. The supernatant remained turbid for up to about 24 or more h.

Between about 5 and 10 min after the start of the experiment, the sediments of tubes 8.B and 8.C appeared to reach a plateau level. After 10 min the pH of tube 8.C was adjusted to pH 4.5 by the addition of HCl. One drop at a time of one mole per liter HCl was added and the pH monitored. One minute was waited between drops. It took about 10 min to reach pH 4.5. The change in pH back to pH 4.5 created a positive charge on the chitosan. The attraction between the silica particles at pH 8 has been changed to electrosteric repulsion at pH 4.5. Sedimentation was allowed to continue. The rate of consolidation in tube 8.C increased and the volume of the sediment decreased.

Figure 26:
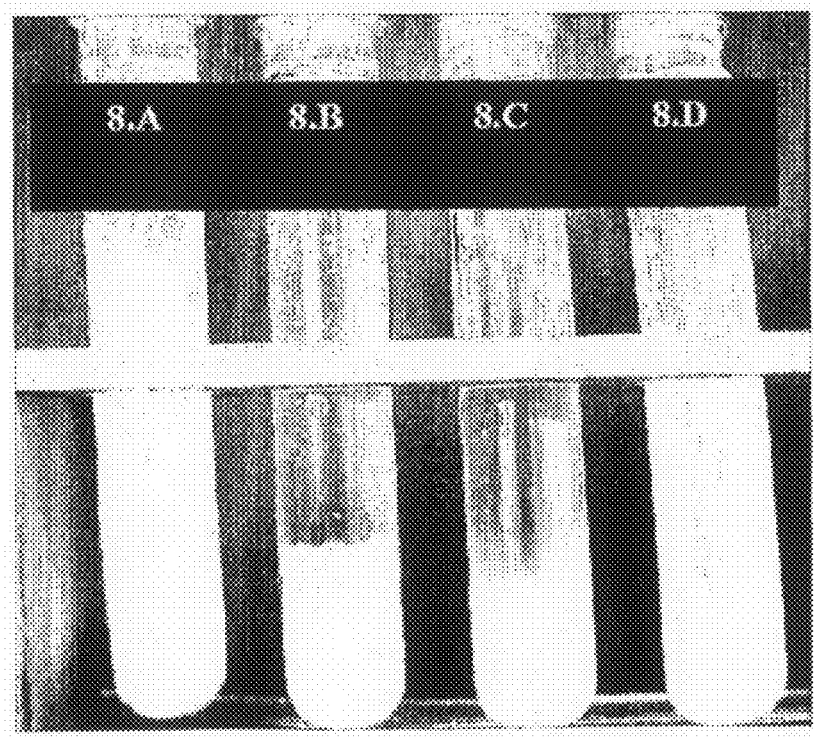
FIG. 26. 3% w/w silica suspensions after 36 h of settling. Tube 8.A contains 1.0% chitosan by weight of silica at pH 4.5; tube 8.B contains 1.0% chitosan at pH 8.5 for the entire time; tube 8.C contains 1.0% chitosan and was at pH 8.5 for 10 min then at pH 4.5; tube 8.D contains no chitosan and was at pH 4.5.
Figure 27:
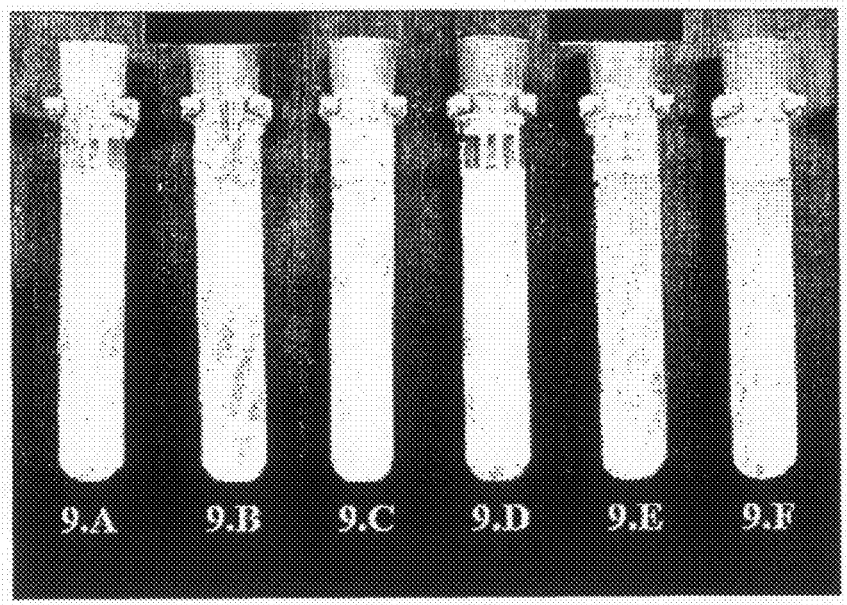
FIG. 27. 5% w/w zircon suspensions after 15 min of settling. Tubes 9.A, 9.B, and 9.C contain 0.5% of chitosan by weight of zircon. Tubes 9.D, 9.E, and 9.F contain 2.0% of chitosan by weight of zircon. Tubes 9.A and 9.D are at pH 5.0 while tubes 9.B; 9.C, 9.E, and 9.F are at pH 7.7.
Figure 28:
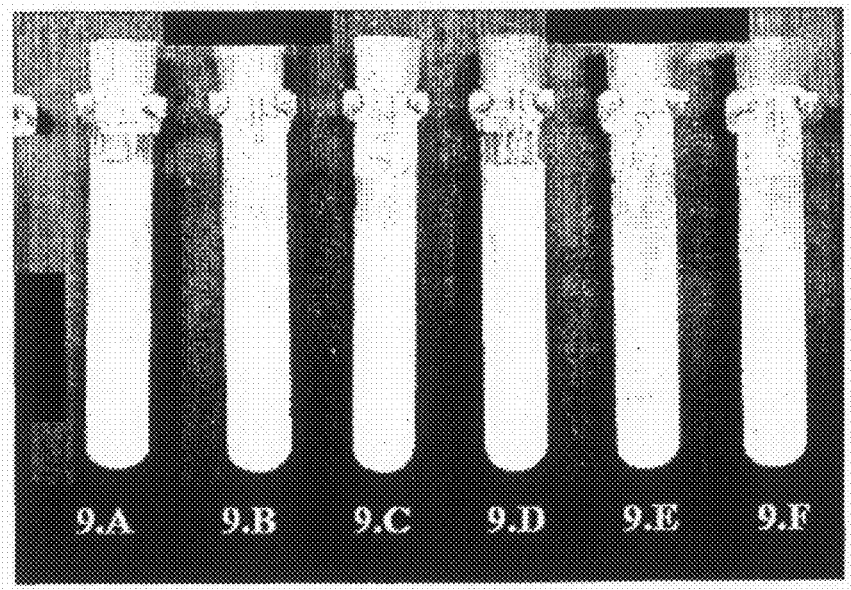
FIG. 28. 5% w/w zircon suspensions after 45 min of settling. Tubes 9.A, 9.B, and 9.C contain 0.5% of chitosan by weight of zircon. Tubes 9.D, 9.E, and 9.F contain 2.0% of chitosan by weight of zircon. Tubes 9.A and 9.D are at pH 5.0 while tubes 9.B, 9.C, 9.E, and 9.F are at pH 7.7.
Figure 29:
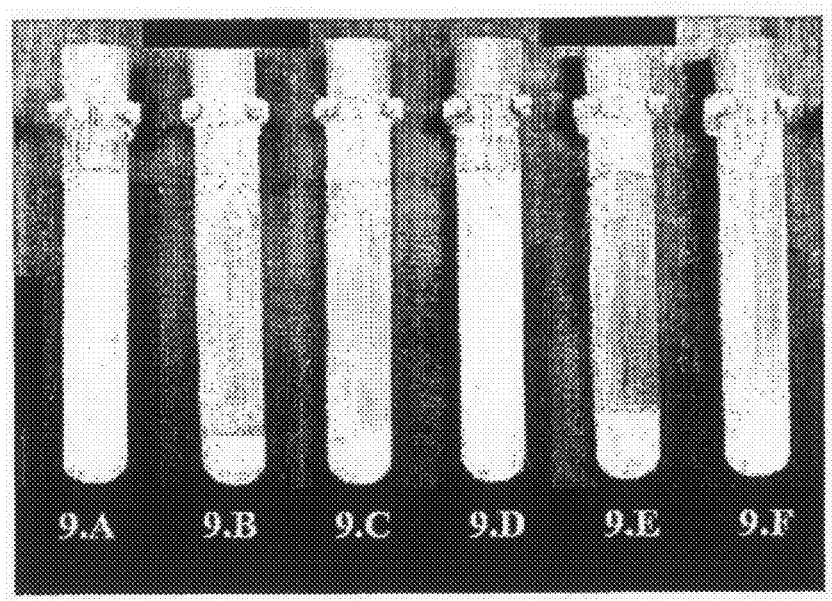
FIG. 29. 5% w/w zircon suspensions after 23 h of settling. Tubes 9.A, 9.B, and 9.C contain 0.5% of chitosan by weight of zircon. Tubes 9.D, 9.E, and 9.F contain 2.0% of chitosan by weight of zircon. Tubes 9.A and 9.D were kept at pH 5.0 the entire time; tubes 9.B and 9.E were kept at pH 7.7 the entire time; tube 9.C was kept at pH 7.7 for 45 min. then at pH 5.0; tube 9.F was kept at pH 7.7 for 90 min. then at pH 5.0.
Figure 30:
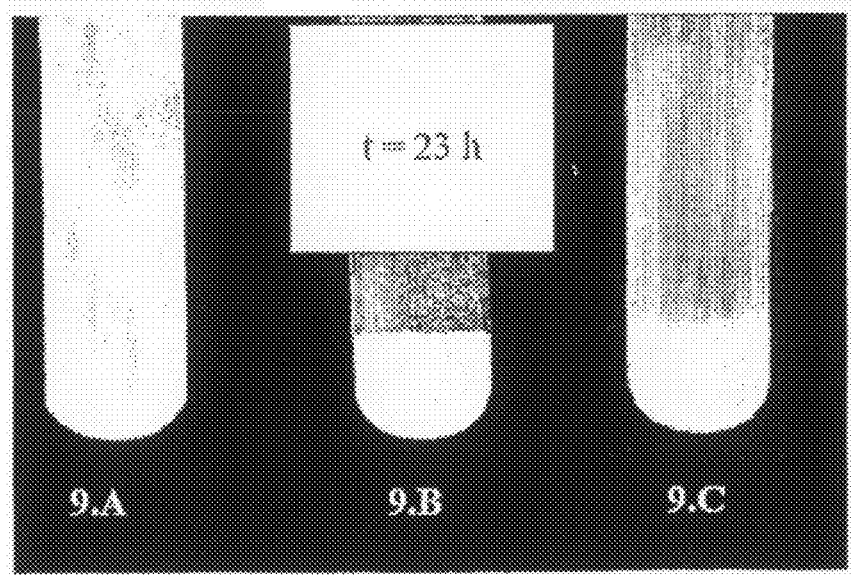
FIG. 30. 5% w/w zircon suspensions after 23 h of settling. The tubes contain 0.5% of chitosan by weight of zircon. Tube 9.A was kept at pH 5.0 the entire time; tube 9.B was kept at pH 7.7 the entire time; tube 9.C was kept at pH 7.7 for 45 min. then at pH 5.0.
Figure 31:
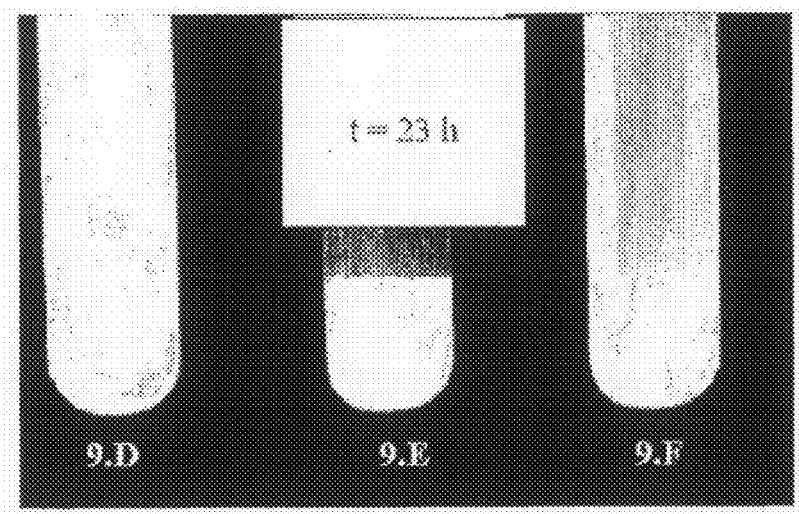
FIG. 31. 5% w/w zircon suspensions after 23 h of settling. The tubes contain 2.0% of chitosan by weight of zircon. Tube 9.D were kept at pH 5.0 the entire time; tube 9.E were kept at pH 7.7 the entire time; tube 9.F was kept at pH 7.7 for 90 min. then at pH 5.0.

Approximately 36 h after the start of the experiment the photograph shown in FIG. 26 was taken. The sediment in tube 8.D occupies the least volume, but the supernatant is not clear. The particles in this tube are well dispersed by EDL repulsion and behave as expected. They have slow settling rates, but form high density sediment beds. The sediment in tube 8.A is also quite dense as it occupies a fairly small volume. The supernatant of this tube is not clear indicating that some particles remain suspended. This tube had some particles that formed small aggregates that did settle, and some particles that were completely coated by the chitosan and became electrosterically stabilized.

The sediment in tube 8.B occupies the largest volume, but this sediment formed very rapidly (within about 10 min). When the pH of the tube was adjusted to pH 8 the chitosan lost its charge and became hydrophobic. The particles became attractive to each other and aggregation and rapid sedimentation occurred. The sediment bed in tube 8.C occupies about the same volume of the sediment in tube 8.A but the supernatant is clear. The sediment in tube 8.C occupies about half the volume of tube 8.B. The particles in tube 8.C formed aggregates and rapidly settled during the first 10 min of the experiment when the tube contents were at pH 8. After 10 min when the pH was changed back to pH 4.5 the sediment consolidated since the chitosan became recharged and the forces between the particles became repulsive. This example illustrates that a wide range of polymer concentrations can be used in this invention.

When a cationic polyelectrolyte is used the polymer is positively charged at low pH and becomes neutral as pH is increased. Cationic polyelectrolytes would usually be used when the particles have low isoelectric point and are negatively charged over much of the pH range. Examples 6, 7, and 8 show the use of chitosan (cationic polyelectrolyte) as a stimulant sensitive flocculant and consolidating aid for silica.

Example 9 shown below demonstrates the use of positively charged chitosan with zircon at pH 5.0 where the zircon is near its isoelectric point (pH 3.8) and only has a small negative charge on its surface.

Example 9 pH Induced Flocculation and Consolidation of Zircon with Chitosan

A zircon powder was obtained from Opacfine, Australia. It had a density of about 4.4 g cm$^{-3}$, about 6 µm average size and an isoelectric point (IEP) of about pH 3.8. It was prepared as a 5% w/w suspension in water at pH about 5.0.

Six test tubes of approx. 60 mL volume were filled with 45 g of the 5% w/w zircon suspension. Sufficient quantity of a chitosan solution was added to tubes 9.A, 9.B and 9.C to produce a 0.5 wt. % chitosan concentration per weight of zircon. Sufficient quantity of a chitosan solution was added to tubes 9.D, 9.E and 9.F to produce a 2.0 wt. % chitosan concentration per weight of zircon. Tubes 9.A and 9.D were kept at pH 5.0. Tubes 9.B, 9.C, 9.E and 9.F were adjusted to pH 7.7 with KOH. The tubes were shaken vigorously for about 30 sec and allowed to sediment under gravity.

The suspensions of zircon with chitosan at pH 5.0 (tubes 9.A and 9.D) remained stable for up to 23 h without any significant amount of sedimentation or clarification (see FIGS. 27 through 31). These suspensions were presumably stabilized by an electrosteric mechanism since the positively charged chitosan would adsorb to the slightly negatively charged zircon. On the other hand the suspensions at pH 7.7 (tubes 9.B, 9.C, 9.E and 9.F) rapidly aggregated and settled rapidly producing high clarity supernatants (see FIGS. 27 and 28). The aggregation was a result of the change to pH 7.7 which caused the chitosan to become uncharged, hydrophobic, strongly adsorb to the particles surfaces and create an attraction between the particles. The suspensions at 0.5% w/w concentration chitosan (tubes 9.B and 9.C) produced slightly faster sedimentation and more dense sediment beds but less clear supernatant than the suspensions containing 2.0% w/w chitosan (tubes 9.E and 9.F). After 45 min of settling the pH of tube 9.C was adjusted to 5.0 with HCl. After 90 min the pH of tube 9.F was adjusted to 5.0 with HCl. The change in pH back to pH 5.0 for these tubes resulted in the re-development of a charge on the chitosan and re-creation of an electrosteric repulsion between the particles. Settling was allowed to continue. After 23 h total settling time the sediments in the tubes adjusted to pH 5.0 (tubes 9.C and 9.F) had consolidated to a greater extent than the sediments in the corresponding tubes that had remained at pH 7.7 (tubes 9.B and 9.E). See FIGS. 29 through 31 and Table 4 for the sediment volumes.

TABLE 4

| Tube number | Sediment volume after 23 h |
|---|---|
| 9.A | N/A stable dispersion |
| 9.B | 6.55 mL |
| 9.C | 5.28 mL |
| 9.D | N/A stable dispersion |
| 9.E | 9.90 mL |
| 9.F | 6.40 mL |

It is also possible to use a polyelectrolyte that has the same sign charge as the particles. Example 10, below, demonstrates this embodiment of the invention using chitosan and alumina. Both the chitosan and alumina are positively charged at pH 5 where the stable suspensions are produced. At pH above about 7 or 8 the chitosan is neutralized and caused aggregation.

Example 10 pH Induced Flocculation and Consolidation of Alumina with Chitosan

A commercial high purity alpha alumina powder (AKP-30, Sumitomo Corp. Japan) with a average particle size of about 0.3 μm and a density of 3.97 g cm$^{-3}$ was dispersed in de-ionised water as a 5% w/w suspension at pH 5.0. The isoelectric point of the alumina is at about pH 9.0. Each of six test tubes of approx. 60 mL volume was filled with 45 g of the 5% w/w alumina suspension. Sufficient quantity of a chitosan solution was added to tubes 10.A, 10.B and 10.C to produce a 1.0 wt. % chitosan concentration per weight of alumina. Sufficient quantity of a chitosan solution was added to tubes 10.D, 10.E and 10.F to produce a 2.0 wt. % chitosan concentration per weight of alumina. Tubes 10.A and 10.D were kept at pH 5.0. Tubes 10.B, 10.C, 10.E and 10.F were adjusted to pH 10.0 with KOH. The tubes were shaken vigorously for about 30 sec and allowed to sediment under gravity.

Figure 32:
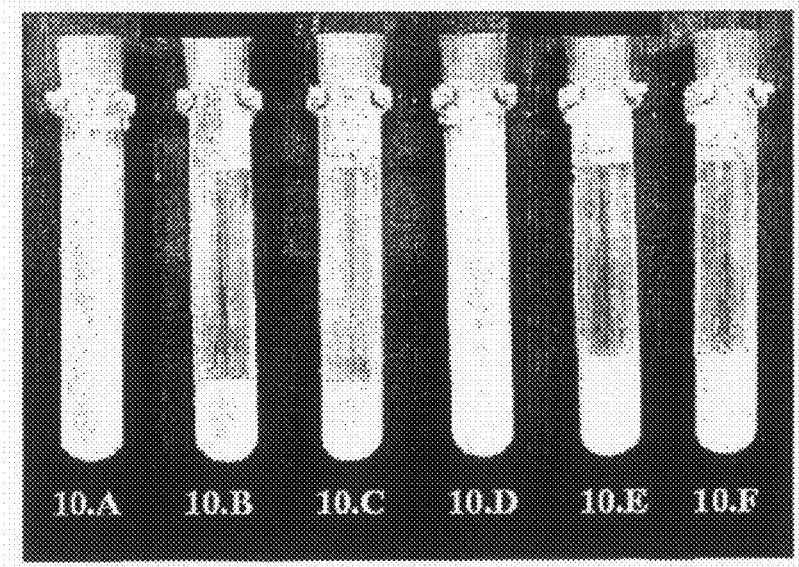
FIG. 32. 5% w/w alumina suspensions after 90 min of settling. Tubes 10.A, 10.B, and 10.C contain 1.0% of chitosan by weight of alumina. Tubes 10.D, 10.E, and 10.F contain 2.0% of chitosan by weight of alumina. Tubes 10.A and 10.D are at pH 5.0 while tubes 10.B, 10.C, 10.E, and 10.F are at pH 10.0.
Figure 33:
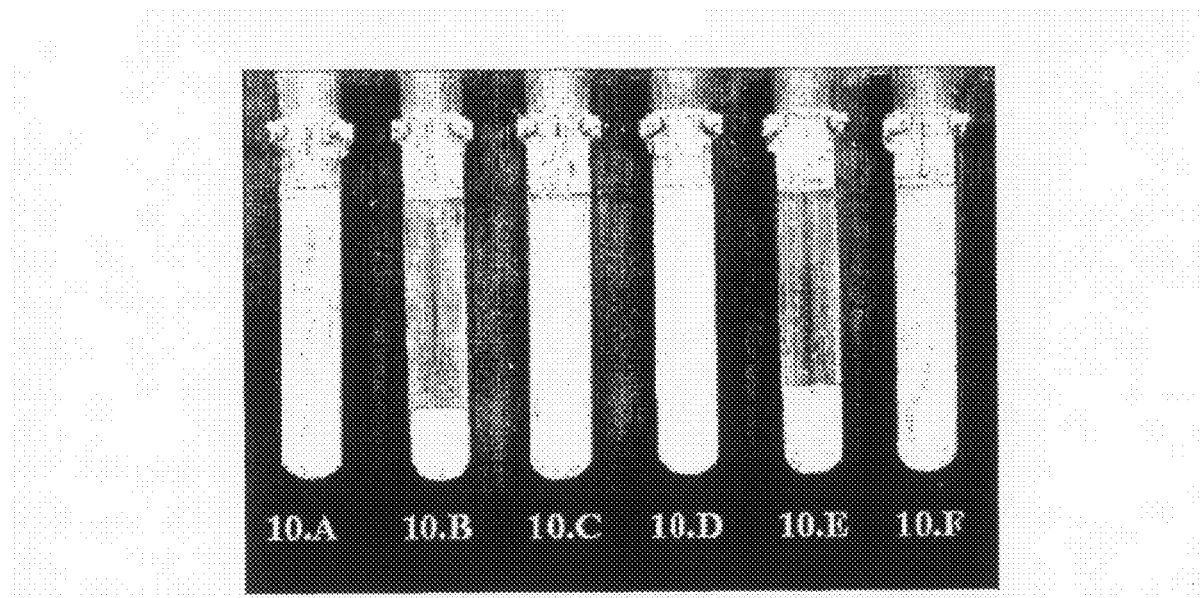
FIG. 33. 5% w/w alumina suspensions after 23 h of settling. Tubes 10.A, 10.B, and 10.C contain 1.0% of chitosan by weight of alumina. Tubes 10.D, 10.E, and 10.F contain 2.0% of chitosan by weight of alumina. Tubes 10.A and 10.D were kept at pH 5.0 the entire time; tubes 10.B, and 10.E were kept at pH 10.0 the entire time; tube 10.C was kept at pH 10.0 for 90 min. then at pH 5.0; tube 10.F was kept at pH 10.0 for 120 min. then at pH 5.0.
Figure 34:
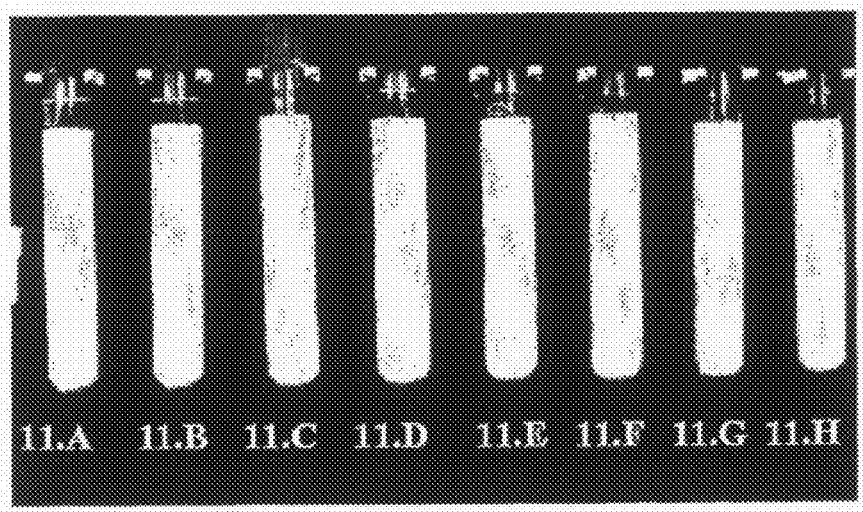
FIG. 34. Silica suspensions (7.7% w/w) at pH 5.5 after 2 min. of settling. Tubes 11.A and 11.B contained no polymer, tubes 11.C, 11.D and 11.E contained 2.5% poly(NIPAM) 132,000 MW, tubes 11.F, 11.G and 11.H contained 2.0% poly(NIPAM) 132,000 MW. Tubes 11.A, 11.C and 11.F are at 22° C., tubes 11.B, 11.D, 11.E, 11.G and 11.H are at 40° C. Note the brightness and contrast of the digital photo have been adjusted in order to make the appearance of the photo similar to the actual visual appearance of the tubes.

The suspensions of alumina with chitosan at pH 5.0 (tubes 10.A and 10.D) remained stable for up to 23 h without any significant amount of sedimentation or clarification (see FIGS. 32 and 33). These suspensions were presumably stabilized either by the high positive charge on the alumina surface or by an electrosteric mechanism if the positively charged chitosan adsorbed to the positively charged alumina by a non electrostatic driving force. On the other hand the suspensions at pH 10.0 (tubes 10.B, 10.C, 10.E and 10.F) rapidly aggregated and settled rapidly producing high clarity supernatants. See FIG. 32. The aggregation was a result of the change to pH 10.0 which caused the chitosan to become uncharged, hydrophobic, strongly adsorb to the particles' surfaces and create an attraction between the particles.

The suspensions at 1.0% w/w concentration chitosan (tubes 10.B and 10.C) produced somewhat faster sedimentation and more dense sediment beds than the suspensions containing 2.0% w/w chitosan (tubes 10.E and 10.F). After 90 min of settling the pH of tube 10.C was adjusted to 5.0 with HCl. After 120 min the pH of tube 10.F was adjusted to 5.0 with HCl. The change in pH back to pH 5.0 for these tubes resulted in the redevelopment of a charge on the chitosan and regeneration of repulsion between the particles. Settling was allowed to continue. After 23 h total settling time the sediments in the tubes adjusted to pH 5.0 (tubes 10.C and 10.F) had consolidated to a greater extent than the sediments in the corresponding tubes that had remained at pH 10.0 (tubes 10.B and 10.E). See FIG. 33 and Table 5 for the sediment volumes.

TABLE 5

| Tube number | Sediment volume after 23 h |
|---|---|
| 10.A | N/A stable dispersion |
| 10.B | 10.77 mL |
| 10.C | 8.72 mL |
| 10.D | N/A stable dispersion |
| 10.E | 13.70 mL |
| 10.F | 10.03 mL |

Temperature as Stimulus

In another embodiment of the present invention, temperature may be used as the applied stimulus. The Applicant has found that such temperature sensitive suspensions can be controlled in a manner similar to the Examples above.

In the following embodiment, a temperature sensitive polymer is applied to the suspension, however, it is not absolutely essential that the temperature sensitive polymer absorb to the surface of the particle. A stable suspension should be made with an appropriate quantity of temperature sensitive polymer at a temperature where the polymer is soluble. The pH of the suspension may need to be adjusted to an appropriate value to develop an electrical double layer repulsion. Alternatively, another adsorbing polymer or surfactant may be used to create a steric repulsion.

The temperature is then changed to another temperature at which the polymer becomes insoluble, e.g. typically higher. The polymer would then become hydrophobic providing a driving force for the polymer to simultaneously adsorb on the particle and aggregate with other polymer molecules. Aggregation will rapidly result and the aggregates will relatively easily be removed from the liquid by methods known to those skilled in the art and as discussed above.

To create repulsion, the temperature may then be altered to another temperature where the polymer is again soluble, e.g. typically lower. Under such conditions, the particles are rendered repulsive and additional water can be recovered from the dewatered product via typical consolidation procedures discussed above.

Example 11

Temperature Induced Flocculation and Consolidation of Silica with 132,000 MW poly(NIPAM) at pH 5.5

Silica (ground quartz, 99% pure) with an average particle size of approximately 2 μm was purchased from Sigma Aldrich. 10% w/w silica was dispersed in distilled water. The pH was adjusted to 5.5 with HCl. Poly(n-isopropyl acrylamide) [poly(NIPAM)] with a molecular weight about 132,000 g mol$^{-1}$ was purchased from Polymer Source Inc. The poly(NIPAM) was dissolved as a 1% w/w solution distilled water at pH 5.5. The pH was adjusted with HCl. The poly(NIPAM) was allowed to dissolve for several h in a refrigerator (about 4° C.), then at room temperature (22° C.) overnight. At temperatures below about 32° C. poly(NIPAM) forms hydrogen bonds with water molecules. This well hydrated form of poly(NIPAM) is water soluble. At temperatures above about 32° C., there is sufficient thermal energy to break the hydrogen bonds holding the water to the poly(NIPAM) and dehydrate the polymer. The dehydrated form of poly(NIPAM) is not soluble in water and precipitates out.

Each of eight test tubes of approx. 60 mL volume was filled with 40 g of the 10% w/w silica suspension. 12 g of water was added to each of tubes 11.A and 11.B. These tubes contained 7.7% w/w silica in water at pH 5.5. 10 g of the 1% w/w poly(NIPAM) solution and 2 g of water was added to each of tubes 11.C, 11.D, and 11.E. These tubes contained 7.7% w/w silica in a solution of 2.5% w/w poly(NIPAM) per wt of silica in water at pH 5.5 8 g of the 1% w/w poly(NIPAM) solution and four g of water was added to each of tubes 11.F, 11.G, and 11.H. These tubes contained 7.7% w/w silica in a solution of 2.0% w/w poly(NIPAM) per wt of silica in water at pH 5.5

It is assumed although not known for certain that the poly (NIPAM) is not adsorbed to the particles surface at room temperature. This is not very important since at room temperature the suspensions would be stable due to steric repulsion if the poly(NIPAM) is adsorbed and the suspension would be stabilized by EDL repulsion if the poly(NIPAM) is not adsorbed. There is no driving force present for adsorption so that the assumption of no adsorption is likely a good one.

The eight test tubes were shaken vigorously for approximately 30 sec. Tubes 11.A, 11.C, and 11.F were placed in a rack to allow the particles to settle at room temperature (22° C.). Tubes 11.B, 11.D, 11.E, 11.G and 11.H were placed in a rack in a 40° C. water bath. It was previously determined that the suspension in the test tube reached 32° C. in about 1 min and 40° C. in about 2 min. The tubes in the water bath were periodically removed from the bath and hung on the rack with the samples that were settling at room temperature. Each time the tubes were removed from the water bath a photo was taken to compare the settling of the eight tubes. Tubes 11.B, 11.D, 11.E, 11.G and 11.H were quickly returned to the 40° C. water bath. Photographs were taken periodically over the next 24 h.

None of the supernatants ever became clear. Some particles always remained suspended indicating that the poly(NIPAM) used was not the optimum flocculant for the silica used. Nonetheless, as will be described next a significant fraction of the solids could be removed from the suspension under the proper conditions. It is expected that a poly(NIPAM) copolymerised so as to have some fraction of charged sites would be a preferred polymer for this invention.

After 2 min of settling tubes 11.A, 11.B, 11.C, and 11.F showed no sign of sediment formation. On the other hand tubes 11.D, 11.E, 11.G and 11.H appeared to have a sediment bed that occupied about 10% of the tubes volume (see FIG. 34). Unfortunately the supernatant was not very clear making it difficult to get a good photograph of the sediment bed. In order to reproduce the actual visual appearance of the sediment beds in this example the photographs have had adjustments to their brightness and contract to enhance the demarcation between the sediment bed and the turbid supernatant above.

Figure 35:
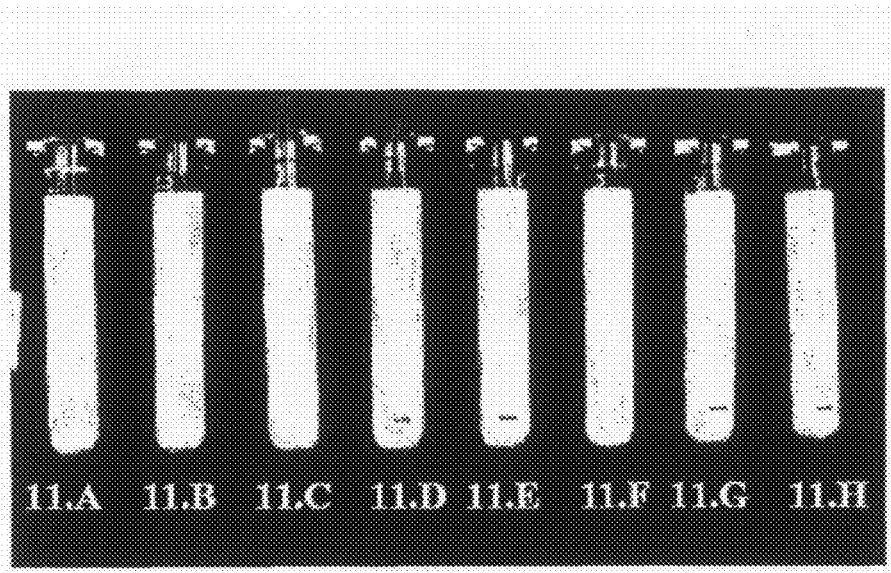
FIG. 35. Silica suspensions (7.7% w/w) at pH 5.5 after 20 min. of settling. Tubes 11.A and 11.B contained no polymer, tubes 11.C, 11.D and 11.E contained 2.5% poly(NIPAM) 132,000 MW, tubes 11.F, 11.G and 11.H contained 2.0% poly(NIPAM) 132,000 MW. Tubes 11.A, 11.C and 11.F are at 22° C., tubes 11.B, 11.D, 11.E, 11.G and 11.H are at 40° C. The black line indicates the sediment height at this time. Note the brightness and contrast of the digital photo have been adjusted in order to make the appearance of the photo similar to the actual visual appearance of the tubes.
Figure 36:
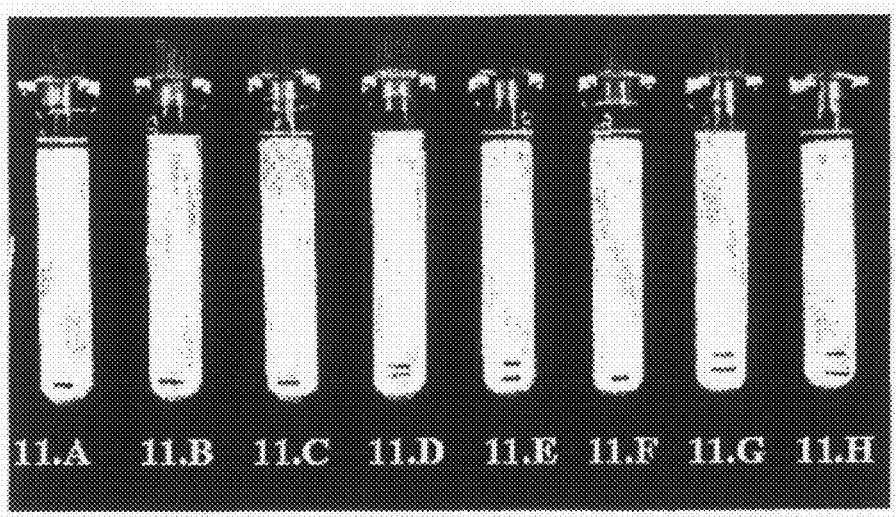
FIG. 36. Silica suspensions (7.7% w/w) at pH 5.5 after 24 h of settling. Tubes 11.A and 11.B contained no polymer, tubes 11.C, 11.D and 11.E contained 2.5% poly(NIPAM) 132,000 MW, tubes 11.F, 11.G and 11.H contained 2.0% poly(NIPAM) 132,000 MW. Tubes 11.A, 11.C and 11.F were at 22° C. the entire time; tubes 11.B, 11.D and 11.G were at 40° C. the entire time; tubes 11.E and 11.H were at 40° C. for 20 min then at 22° C. for the remainder of the time. The upper black line indicates the sediment height at 20 min and the lower black line indicates the sediment height after 24 h. Note the brightness and contrast of the digital photo have been adjusted in order to make the appearance of the photo similar to the actual visual appearance of the tubes.
Figure 37:
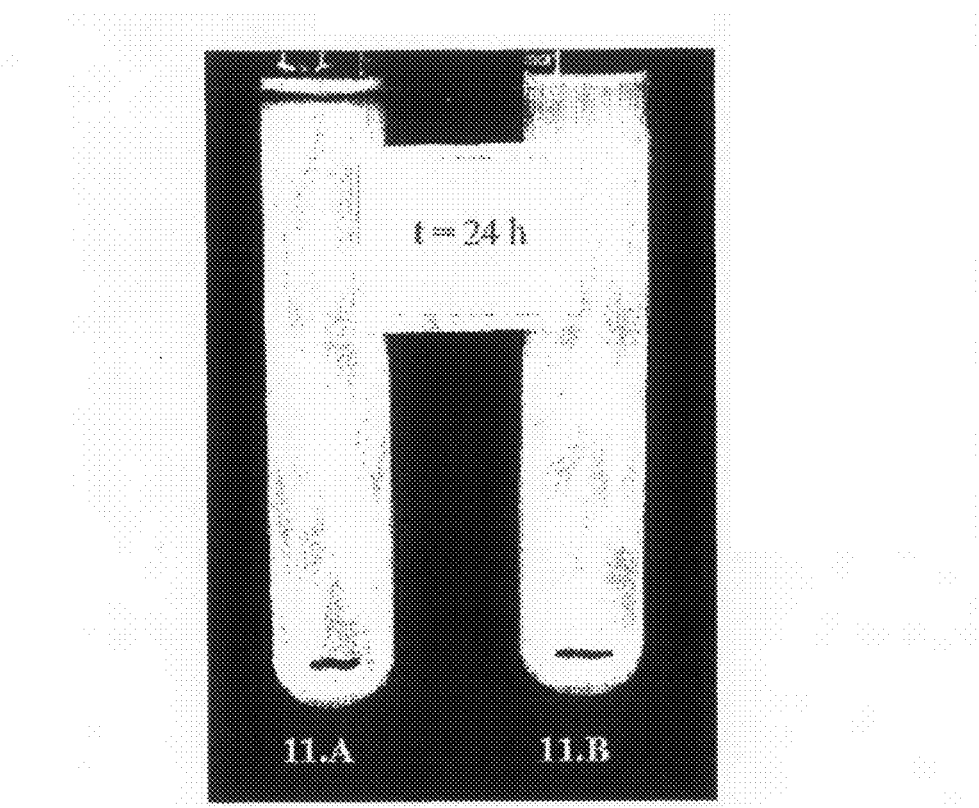
FIG. 37. Close up photo of tubes 11.A and 11.B, same conditions and time as in FIG. 36.
Figure 38:
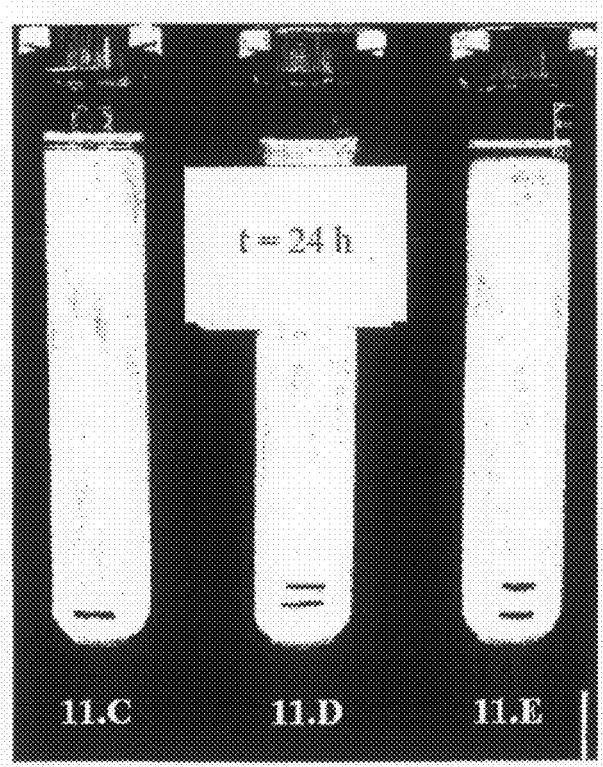
FIG. 38. Close up photo of tubes 11.C, 11.D and 11.E, same conditions and time as in FIG. 36.
Figure 39:
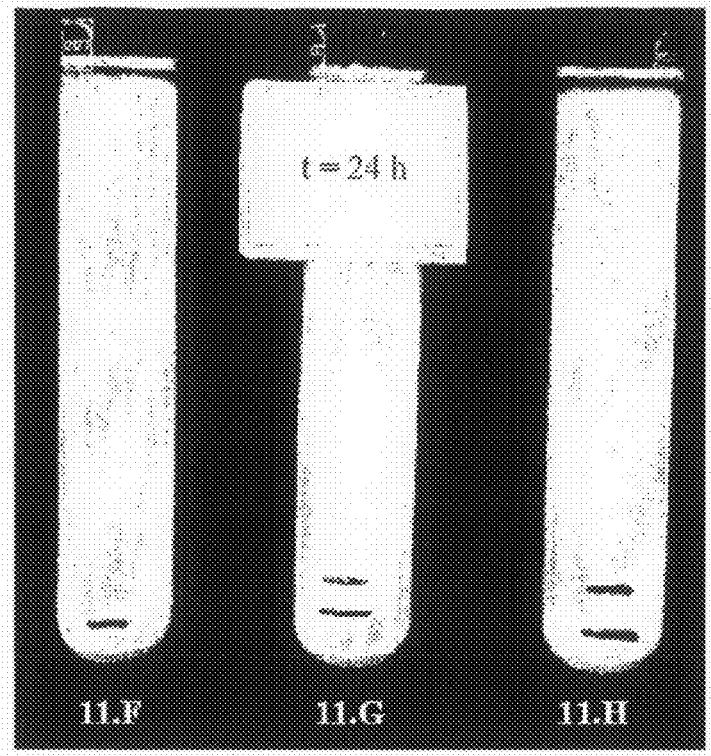
FIG. 39. Close up photo of tubes 11.F, 11.G and 11.H, same conditions and time as in FIG. 36.

The rapid sedimentation that occurred in tubes 11.D, 11.E, 11.G and 11.H, when their temperature exceeded about 32° C. is because the poly(NIPAM) becomes hydrophobic, adsorbs onto the particles surface and creates a bridging or hydrophobic attraction between the particles. The particles quickly aggregate and begin to settle rapidly. After about 10 min the sediment level does not change much. FIG. 35, shows the sediment after 20 min (height same as after 10 min). The black lines were drawn with a felt tipped pen to indicate the level of the sediment in tubes 11.D, 11.E, 11.G and 11.H. No sediment was noticed in the other tubes.

After 20 min of sedimentation tubes 11.E and 11.H were allowed to cool to room temperature (22° C.) for the rest of the experiment. Tubes 11.B, 11.D and 11.G were kept at 40° C. for the remainder of the experiment. When tubes 11.E and 11.H were cooled to room temperature the poly(NIPAM) became rehydrated and was able to dissolve in the solution. The attraction that was present between particles at 40° C. returned to repulsion as the poly(NIPAM) redissolved once the temperature was lowered. Once the repulsive force between particles was restored the sediment bed began to slowly consolidate. After 18 h of sedimentation all 8 tubes had a visible sediment layer. The sediment heights were marked with a second black line on the tubes. The sediment heights were the same after 24 h as they were after 18 h. FIGS. 36, 37, 38 and 39 show the tubes after 24 h of sedimentation. None of the supernatants were completely clear. The suspensions without any polymer at both 22° C. and 40° C. (tubes 11.A and 11.B respectively) had small volume of sediments, typical of sediments from well-dispersed suspensions, but it took many hours for the sediments to form. Similarly tubes 11.C and 11.F had small sediment volumes that took many h to form, indicating that these suspensions (containing 2.5 wt % and 2.0 wt % poly(NIPAM) respectively) that were kept at 22° C. for the entire experiment were well dispersed suspensions.

The tubes that were kept at 40° C. for the entire experiment (11.D and 11.G) had the largest sediment volumes. The sediments in these tubes settled rapidly (in less than 10 min.) then continued to consolidate for some time after 20 min reaching an equilibrium in less than 18 h.

The final two suspensions (11.E and 11.H had sediments that occupied about the same volume as the well dispersed sediments (tubes 11.A, 11.B, 11.C, and 11.F). These two suspensions (11.E and 11.H) were initially kept at 40° C. for the first 20 min during which time the sediment rapidly formed. After 20 min the temperature of these two suspensions (11.E and 11.H) was kept at 22° C. during which time the sediments consolidated to a greater extent then for the same suspensions kept at 40° C. for the entire experiment (tubes 11.D and 11.G).

The final sediment volumes after 24 h for each of the 8 tubes is given in Table 6.

TABLE 6

| Tube number | Sediment volume after 24 h |
| --- | --- |
| 11.A | 3.01 mL |
| 11.B | 2.85 mL |
| 11.C | 2.40 mL |
| 11.D | 3.94 mL |
| 11.E | 2.47 mL |
| 11.F | 2.60 mL |
| 11.G | 4.04 mL |
| 11.H | 2.68 mL |

Tubes 11.A and 11.B contained no polymer and were held at 22° C. and 40° C. respectively for 24 h as control samples. No difference in settling was observed between the two tubes so that any effect of temperature difference on the settling could be ruled out.

Example 12

Temperature Induced Flocculation and Consolidation of Zircon with Methylcellulose A zircon powder was obtained from Opacfine, Australia. It had a density of about 4.4 g cm$^{-3}$, about 6 μm average size and an isoelectric point (IEP) of about pH 3.8. The zircon was prepared as an 8% w/w suspension in distilled water at pH 3. Methylcellulose (average MW approximately 86,000) was obtained from Aldrich Chemicals. It was dissolved in distilled water as a 1% w/w solution by initially dispersing the polymer powder in a small quantity of 80° C. water, then adding the remaining water at room temperature. The methylcellulose was allowed to dissolve for at least 2 days and the pH of the solution was adjusted to 3. Methylcellulose has a critical solution temperature of 50° C. (Sarkar N., "Thermal gelation properties of methyl and hydropropyl methylcellulose". *J. Applied Polymer Sci.* 1979; 24:1073-1087).

Each of five test tubes of approximately 60 mL volume was filled the appropriate amount of the 8% w/w zircon suspension and either distilled water or methylcellulose solution to produce 6.9% w/w zircon suspensions with the following solution conditions. Tubes 12A and 12B contained no polymer. Tubes 12C, 12D and 12E contained 1% w/w methylcellulose as weight per weight of zircon. The pH in all the tubes was 3. The five test tubes were shaken vigorously for approximately 30 sec. Tubes 12A and 12C were placed in a rack at room temperature (22±2° C.) on the lab bench to allow the particles to settle. Tubes 12B, 12D, and 12E were placed in a rack suspended in a hot water bath at 75±2° C. The tubes were corked with rubber stoppers to avoid evaporation. The heated tubes were intermittently removed from the hot water bath for a period of less than one minute to allow for photographs to be taken at frequent time intervals over the next several days.

Figure 40:
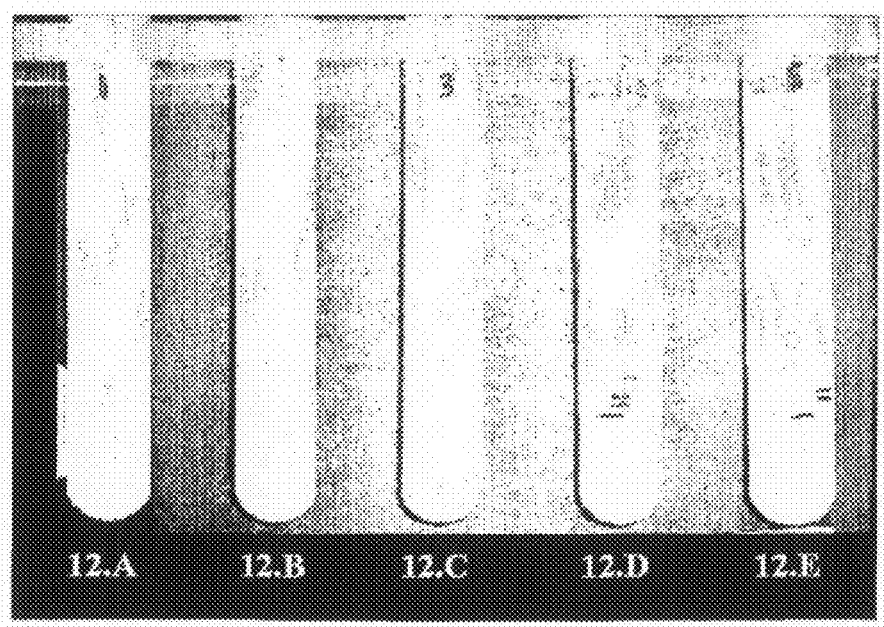
FIG. 40. Zircon suspensions (6.9% w/w) at pH 3.0 after 45 min. of settling. Tubes 12.A and 12.B contained no polymer; tubes 12.C, 12.D and 12.E contained 1.0% methylcellulose (86,000 MW). Tubes 12.A and 12.C are at 22° C., tubes 12.B, 12.D, 12.E are at 75° C.
Figure 41:
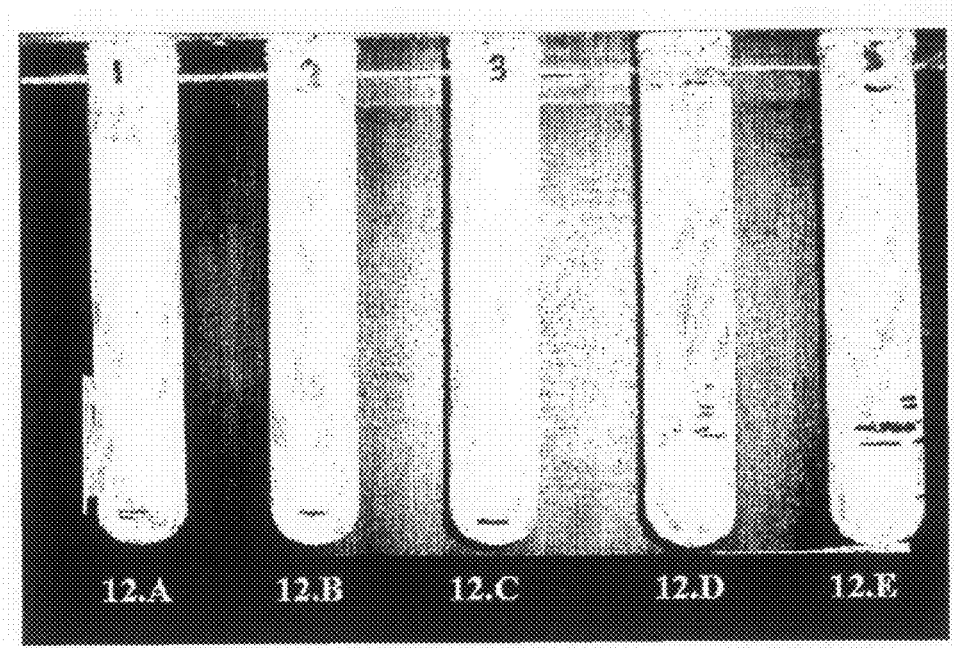
FIG. 41. Zircon suspensions (6.9% w/w) at pH 3.0 after 24 h of settling. Tubes 12.A and 12.B contained no polymer; tubes 12.C, 12.D and 12.E contained 1.0% methylcellulose (86,000 MW). Tubes 12.A and 12.C were at 22° C. the entire time, tubes 12.B and 12.D were at 75° C. the entire time. Tube 12E was at 75° C. for the first 90 min then at 22° C. for the remainder of the time.
Figure 42:
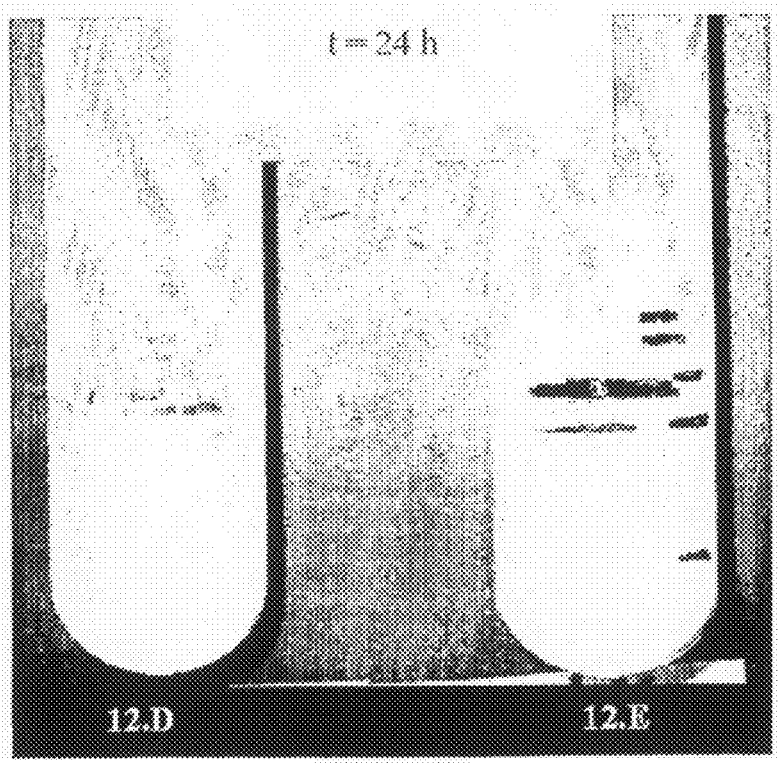
FIG. 42. Close up photo of tubes 12.D and 12.E same conditions and time as in FIG. 41.

The suspensions without any polymer (tubes 12A and 12B) remained stable for a period of several days at both room temperature and elevated temperature. The suspension containing 1% w/w methylcellulose remained stable at room temperature for several days (tube 12C). As shown in FIG. 40, the suspensions containing 1% w/w methylcellulose at 75° C. (tubes 12D and 12E) began to aggregate after about 5 min and settled within the tube to reach a relatively stable height after about 45 min. The aggregation occurs once the methylcellulose solution is heated above its critical solution temperature (about 50° C.), becomes hydrophobic and precipitates out of solution. The methylcellulose adsorbs on to the particles surfaces and renders them hydrophobic as well. The hydrophobic particles rapidly aggregate. After 90 min tube 12E was removed from the hot water bath and allowed to cool to room temperature. Once cool it continued to slowly consolidate. After 24 h (see FIGS. 41 and 42) the volume of the sediment in tube 12E was 10.25 mL compared to 11.54 mL for tube 12D. This equates to an 11% reduction in the sediment volume.

Light as Stimulus

In another embodiment, light, darkness or change of light wavelength, may be used as a stimulus. A photosensitive molecule or polymer may be added to a suspension of colloidal particles in such a quantity to produce a stable suspension. The wavelength of light (or absence of light) should be such that the photosensitive molecule or polymer is in its hydrophilic configuration. The stable suspension may be produced either by using small non-adsorbing molecules that don't cause aggregation or an adsorbing polymer that causes steric stabilization. Light can be either removed, added, or the wavelength changed such that the photosensitive molecule or polymer changes configuration such that it becomes hydrophobic and poorly soluble in water. When the molecule or polymer is hydrophobic and poorly soluble in water it will adsorb on the particles' surfaces causing the particles to associate due to van der Waals, bridging, and/or hydrophobic attraction. Large aggregates will form and rapid settling will result. After a sufficient period of time, the clear supernatant can be removed from the top of the sediment. The lighting condition can then be reverted to that required to produce the hydrophilic configuration of the photosensitive additive and the particles will revert to being dispersed by repulsive forces. The sediment will then consolidate to a higher density than if the attraction remained. With this method, additional water (or other liquid) can be expressed from the dewatered product.

INDUSTRIAL APPLICABILITY

The present invention is useful in a wide variety of industries. The ability of the present invention to control the state of a suspension and revert the suspension into a dual phase mixture of solids-rich phase and liquids-rich phase provides significant advantages over the prior art and significant benefits for downstream separation processes.

Not only does it provide rapid settling of the solid particles in the suspension and additional liquid recovery via the further consolidation step of the sediment bed, it also allows for control of the liquid content/viscosity of the sediment which, as discussed above, has significant advantages in terms of pumping and the like.

The reduced moisture content of the dewatered product means that the total volume of the dewatered product occupies less volume compared to dewatered product produced with the prior art. This is a particular advantage when the dewatered product is a mineral tailings or sewage sludge that must fit into a finite amount of space. Furthermore, the additional liquid (such as water) recovered from the solids can be reused in the process, alleviating the need to obtain a new supply of the liquid.

The technique of applying a suitable stimulus can be accomplished using conventional equipment and control of such a stimulus, e.g. pH or temperature is also well known in the art.

In some cases the temperature change may already be present in the process such as in the refining of Bauxite to alumina, where the product is initially at temperature about 80° C. and eventually cooled to room temperature. Likewise the application of light may occur for instance in a conventional thickener naturally due to the sun (in daytime, of course at night artificial light would have to be used). The suspension and photosensitive flocculent are added to the top of the thickener where the solids concentration approaches zero. Thus light can easily penetrate the top section of the thickener and stimulate flocculation. The resulting aggregates will rapidly settle to form a sediment bed. The density of the sediment bed will be high enough to make the sediment bed opaque. Since light cannot penetrate into the sediment, then the state of the suspension will revert to dispersed and the sediment will consolidate to greater solids concentration compared to the currently utilized flocculants.

It will be appreciated that the present invention may provide means of effecting stimulant-sensitive flocculation and consolidation.

Although the invention has been described with reference to specific examples it will be appreciated by those skilled in the art that the invention may be embodied in many other forms.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The claims defining the invention are as follows:

1. A method of separating solid particles from a suspension comprising a liquid, comprising: applying one or more stimuli to said suspension, said one or more stimuli adapted to control inter-particle forces between said solid particles to form a conditioned state comprising a solids-rich phase and a liquids rich phase, wherein each stimulus is selectively operable to effect reversibly operable conditioning between an initial state prevailing prior to said applying one or more stimuli and said conditioned state resultant from said applying one or more stimuli, thereby to control interaction between said solid particles, wherein said one or more stimuli comprise a chemical additive, wherein said chemical additive is a photosensitive molecule, incorporated within one or more polymers, at least one which is a water-soluble polymer, said photosensitive molecule being associated with a predetermined change in light wavelength; consolidating said solids-rich phase by facilitating said reversibly operable conditioning to liberate at least some liquid otherwise trapped among said solid particles, wherein said reversibly operable conditioning is effected by applying light to the chemical additive; and separating said solids-rich phase from said liquids-rich phase.

2. A method of controlling consolidation of a bed of solid particles within a liquid including applying one or more stimuli to said bed, said one or more stimuli adapted to control inter-particle forces between said solid particles to form a conditioned state comprising a solids-rich phase and a liquids-rich phase, wherein each stimulus is selectively operable to effect reversibly operable conditioning between an initial state prevailing prior to said applying one or more stimuli and said conditioned state resultant from said applying one or more stimuli, thereby to control interaction between said solid particles, said stimulus being applied for a predetermined time thereby to liberate at least some liquid otherwise trapped within said bed, wherein said one or more stimuli comprise a chemical additive, wherein said chemical additive is a photosensitive molecule, incorporated within one or more polymers, at least one which is a water-soluble polymer, said photosensitive molecule being associated with a predetermined change in light wavelength, wherein said reversibly operable conditioning is effected by applying light to the chemical additive; and separating said solids-rich phase from said liquids-rich phase.

3. A method according to claim 1 or claim 2, wherein said reversibly operable conditioning is facilitated by removal of said one or more stimuli, and/or by addition of another of said one or more stimuli.

4. A method according to claim 1 or claim 2, wherein said reversibly operable conditioning is facilitated substantially by way of flocculation and/or coagulation.

5. A method according to claim 1 or claim 2, wherein said inter-particle forces are attractive or repulsive between said solid particles within said liquid.

6. A method according to claim 1 or claim 2, wherein each of said one or more stimuli is applied for a predetermined time, thereby to induce the desired attraction or repulsion and subsequently removed or altered, thereby to effect said reversibly operable conditioning.

7. A method according to claim 1 or 2, wherein said polymers suitable for the inclusion of photosensitive units include polypeptides comprising lysine and glutamic acid.

8. A method according to claim 1 or 2, wherein said polymer is selected from the group consisting of polyacrylamides, polysaccharides, and polyelectrolytes.

9. A method according to claim 1 or 2, wherein said photosensitive molecules are spyropyrans, spyrooxazines, azo benzenes, or triphenyl methane derivatives.

10. A method according to claim 9, wherein said spyropyrans and/or spyrooxazines are selected from the group consisting of benzoindolino pyranospiran (BIPS), benzoindolino spyrooxazine (BISO), naphthalenoindolino spyrooxazine (NISO) and quinolinylindolino spyrooxazine (QISO).

11. A method according to claim 1 or 2, wherein said polymers responsive to said change in wavelength are selected from the group consisting of poly dimethylacrylamide/N-4-phenylazophenylacrylamide (DMAAm) and poly dimethylacrylamide/4-phenylazophenylacryate (DMAA).

* * * * *